2,867,522

METHOD FOR PRODUCING FERTILIZERS AND BASES FROM SLUDGES

Leroy Henry Facer, Phelps Township, Ontario County, N. Y., assignor, by mesne assignments, to Glenn C. Cooley, Schenectady, N. Y., Warren Dunham Foster, Ridgewood, N. J., and Halfdam Gregersen, New York, N. Y., trustees No Drawing. Application April 23, 1951
Serial No. 222,536

27 Claims. (Cl. 71—37)

As is well known to the practitioners of the fertilizer art, the three major products of importance in any complete or mixed fertilizer are nitrogen (N), phosphorus ($P_2O_5$) and potash ($K_2O$), and in the United States almost all formulae of fertilizers are stated in terms of the percentage of each constituent arranged in the foregoing order. According to the processes of this invention, I make much more efficient use than is common of a heavy mineral acid to secure bases including all three fertilizer elements and magnesium or other so-called minor but highly important metallic elements, with two or all of said ingredients in combination. By mixing these bases in various proportions, I may produce practically speaking any desired end mixture making up a complete fertilizer, that is one containing nitrogen, phosphorus and potash. A major object of this invention is to obtain a valuable end product either by a direct use of materials which ordinarily are either wasted or must be expensively reprocessed for effective use, or alternatively or in addition by the use of such materials in a manner to produce at one operation both a major composite product and a minor but important by-product.

In my co-pending parent application, Serial Number 450,324, filed July 9, 1942, of which this application is a continuation-in-part, I presented principles and processes and claims to processes in accordance with the above and other generalized statements hereof. The present application is limited to such processes which produce a valuable fertilizer base combining two or more fertilizer components from intermediate acid-containing masses without processing such intermediates into finished independent products and then combining them.

A major object of this invention, therefore, is to effect great economies in materials, labor, capital and time by producing in a single operation a combined product which previously has been made by mixing two independently made and finished products each containing a single ingredient. I accomplish this result, as illustrated herein, either by stopping a process affecting one material at an early stage while it still contains an unused acidic component or by improving that process by adding such an amount of acid that a portion thereof remains unused and then utilizing that acidic component or excess of acid to acidulate another material so that I obtain a product combining both materials without having been put to the added time and expense (and capital requirement) of having carried two separate operations to a conclusion and then mixing finished products. One or more of these unfinished and unmerchantable intermediate materials so consolidated in a sludge, as later herein carefully defined. These principles are applied herein to more than two materials as well as to merely two, and to a plurality of sludges.

In carrying out the above and other principles of this invention I may make use as an agent profitably to utilize the excess acid of such a sludge either phosphate rock or ores, in carbonate or other acid soluble forms, of those metals which are valuable for plant growth, such for illustration as magnesium, manganese, copper, zinc and iron. My invention is illustrated in detail by the use of magnesium-bearing ores including dolomite limestone, in various combinations with intermediate products carrying nitrogen, phosphorus, potash or gypsum, alone or in combination.

The material most widely used as a source of phosphorus, either in a mixed fertilizer or alone, is superphosphate. Superphosphate is made by treating ground phosphate rock with sulphuric or other strong mineral acid in order to convert to phosphate in the rock, which is in a form in which it cannot be used by the plant, to a form in which it can be so used. In my parent application I apply principles similar to those claimed herein to the production of superphosphate as a finished product but herein I claim novel methods for producing a superphosphatic fertilizer as a part of a continuous or virtually continuous process including the use of a sludge which results in a two element or a multi-element fertilizer. Herein I add ground phosphate rock or other material rendered valuable to plant growth by acidulation to an acidic mass containing another fertilizer ingredient and so utilize such acid component that in addition to securing additional amounts of plant food by the conversion of the insoluble phosphorus of the rock or other ore to a form which can be used by the plant I either rid the mass of free acid which otherwise would have to be neutralized, without resulting benefit, or removed and concentrated or purified by an expensive process, prerequisite to later re-use, or subjected to a plurality of such processes. Superphosphate when a component of a complete fertilizer is either mixed physically with nitrogen or potash or a minor element or combined chemically herewith, or in part mixed and in part combined.

A fundamental object of this invention, therefore, is the manufacture of this final merchantable fertilizer multi-element product, in whole or in part, from partially completed components in a manner which saves cost, time and trouble. This invention consolidates or telescopes into each other two or more processes which according to the prior art were separately carried to a conclusion and then the plurality of finished products so made mixed together to form another finished product.

For convenience herein and in the sub-joined claims I designate these incomplete, unmerchantable, moist, intermediate fertilizer ingredients as "sludges." I use the word "sludge" in its ordinary dictionary meaning as defining a mass of material which is neither palpably dry nor yet completely liquid. It resembles mud or slush except that it is made up of small discrete particles which are granular or crystalline. It is acidic. Upon the admixture of a dry acid-consuming material thereto it may be said to resemble fine wet sand or, better, a sandy mud. Thereupon it can be molded and hence is plastic, and in most cases can be handled substantially as a dry material. In common with others who follow meanings as established by recognized dictionaries, I apply this word to a material which in its sludge form is not merchantable or a product intermediate between raw materials and a finished product. Such sludges in certain instances are by-products.

A related object of this invention is carried out by what amounts to double use of a heavy mineral acid, sulphuric for purposes of illustration, or a product of its use. According to the practices of the prior art, this acid, in a relatively small amount, is present together with the fertilizer component as a part of certain conventional by-products. According to prior practice this excess acid is neutralized to form an inert material which is useless for the production of food when applied to the soil or is removed by heat, centrifuging or otherwise. An object of this invention is to employ this acid which others waste or do not use to the best advantage as a component in what by others has been a separate fertilizer operation. I therefore over-aciduate one component of a finished fertilizer or take such a component which normally is over acidulated and then neutralized to no useful end and employ this acidic component to perform another operation which results in the formation of a combined product by such telescoping of what otherwise has been separate and generally wasteful steps. My method of operation at an intermediate stage of creating a merchantable base results in a higher acidic component which I utilize advantageously.

A related object is to avoid the use of a high heat, particularly long continued, by accomplishing a first result by the use of acid to an amount greater than that required to supply a stoichiometric mixture and effectively utilizing the resulting acidic component in the treatment of another component which otherwise would have to be separately acidulated and then mixed with the product resulting from the first operation. The economy and simplicity of such an operation is greater than first appears. Not only is the application of heat expensive but elaborate apparatus high in capital cost is required. For example, as later stated, according to the principles of this invention I accomplish in ten minutes or less without heat in any ordinary mixing operation a result which for others requires six hours of high heat with continuous mixing.

Another and wholly novel sludge containing gypsum, differing in certain characteristics from the other sludges described and also claimed herein, is a by-product of my novel production of phosphoric acid, which is described and claimed in my said copending parent application and in my application Serial Number 221,932, filed April 19, 1951, which on March 27, 1956, matured as Patent Number 2,740,116. This novel phosphorus-carrying gypsum sludge in combination with my other novel sludges or with other fertilizer materials or with both is useful in the making of desirable mixed fertilizers. This sludge is relatively moist and since it contains fully hydrated gypsum does not acquire additional moisture. This gypsum sludge therefore is useful as a pelleting agent when introduced at the start of a pelleting operation in combination with other ingredients which without it are lacking in moisture or in aggregative capacity. An object of the present invention is to present such a sludge alone and in combination.

As is stated in my parent application, Serial Number 450,324, I have found that it is desirable to divide phosphate rock or other profitably acid-consuming materials into a plurality of portions and to mix them successively with masses containing except at the time of the final admixture more than enough acid to acidulate the quantity of such acid-consuming material then present. As applied to the making of superphosphate, triple superphosphate and phosphoric acid, I divide the phosphate rock either on the basis of the digestive characteristics of the rock in relation to the acid employed or upon particle size. If the product is to be pelleted I make a third division. In every instance the first division of material to be acidulated is mixed with an amount of acidic potential sufficient for the acidulation of the entire amount of material then and later to be added. If the end product is to be pelleted I preferably divide the remaining material into two portions. The first of these two portions is an amount necessary to render the mass to be pelleted sufficiently plastic for that operation. The second portion (of this latter division) is added in the pelleting drum at a late stage of the pelleting operation and is of an amount sufficient to utilize the remaining free acid of the pellets and maintain their identity. As repeatedly stated in my said parent application this third amount is of the order of 5 percent of the total end product (that is, 100 pounds to a ton). In those instances in which I pellet I reserve the relatively fine material for the coating.

These discoveries are equally applicable to the subject matter of this application. The division of the mass to be acidulated into coarse and fine particles is particularly useful when the material to be acidulated is hard to digest and expensive to grind fine. In such instances I first apply the entire amount of concentrated acid necessary for the acidulation of the entire quantity of the given ore to the fraction containing only the coarse particles. As a result the material does not become a hard ball or mass thereby preventing the acid from reaching all of its particles. Also, the total power requirement is much reduced. In the past to prevent such a condition the acid has been highly diluted to keep the entire mass liquid, thereby necessitating a later drying operation. Also, it has been considered possible to use a concentrated acid and during the mixing of all of the acid with all of the rock constantly to break the mass up. According to my procedure a relatively concentrated acid may reach all of the coarse particles of the entire mass provided I apply to that mass enough concentrated acid to acidulate the entire quantity. Thereafter I add the remaining fine particles to the original over-acidulated mass, which is sufficiently liquid to be easily handled. The remaining acidic component easily and quickly acidulates this second portion. I carefully regulate the amount of moisture present in the acid and the ores so that all (except for the small amount which is lost by the heat of reaction) is utilized as water of crystallization. As a consequence artificial drying is not necessary and the resulting product is dry and of excellent physical condition. I thus greatly reduce power requirements, cost of handling and time of processing.

A major object of the present invention is to apply to the specialized processes and products of this application the principles and methods of pelleting and moisture-control which are disclosed and broadly claimed in my co-pending application Serial Number 432,350, filed February 25, 1942, which on March 27, 1956, matured as Patent Number 2,739,886, which is parent to said application Ser. No. 450,324, parent hereto. According to this practice I mix ground phosphate rock or another ore and an acid, generally but not necessarily sulphuric, in the usual way, with or without adding other fertilizer ingredients at this time, and pour the resulting mixture into a conventional receptacle known as a den or handle it in a novel manner therein described. According to one of the methods I may remove the material from the den after it has solidified and thereupon preferably while still hot and chemically active pellet it, having mixed it with other plant food as desired. In the latter portion of the pelleting operation I prefer to add a coating material preferably but not necessarily ground phosphate rock which because the material is still moist adheres to the surface thereof and because it is still chemically active is chemically bonded thereto, thus maintaining the integrity of the pellets. It is essential to the full practice of my invention that there be no dehydration whatsoever, whether from heat, a vacuum, a blast of air, repeated crane movement, piling in large masses or otherwise, from the time the material is taken from the den (or its equivalent). I must originally supply and maintain throughout the curing process the amount of moisture necessary for complete crystallization. Thus I secure a dry and permanent pellet almost immediately available for use without the expensive processes which have been used by others. I emphasize that the identical moisture which is present at the start of the operation is present in the finished product. My results are not obtained by later additions of an amount of moisture equal to that removed. Removal of original moisture after crystallization, irrespective of the account later present, defeats my purpose. An important object of this invention is to apply these principles to the specialized operations and products disclosed and claimed herein.

If the above teaching is carried out and dehydration of the crystal is completely avoided I secure not only a better physical product, one which is dry, free flowing and inexpensive, but also one of which the phosphatic content has markedly increased crop-producing characteristics as is set out in my said co-pending application Serial Number 432,350. Therefore a related object of my invention is to provide a chemically superior phosphatic fertilizer. Even when I do not employ a phosphatic material I have found that as above I may obtain the physical properties of my characteristic phosphatic product.

A primary object of this invention is to apply the above principles and procedures to the production respectively by one continuous operation depending upon the use of an over-acidulated sludge of a highly desirable potassic phosphatic base of low chlorine content, an ammonium phosphate base, and a base containing potash and either magnesium or phosphorus or both, these bases being used either as complete in themselves or combined one with another, or with my novel gypsum phosphorus bearing sludge, or with other fertilizer ingredients. In each instance I combine an over-acidulated fertilizer-bearing mass with other such masses or with other fertilizer materials or both to produce in a single process (or two closely related processes under certain instances) what otherwise has been done separately.

Other objects, advantages and characteristics will be clear from the foregoing generalized portion of this specification and the detailed description which follows. It will be understood that I am showing for purposes of illustration only preferred embodiments of my invention and changes may be made therein without departing from the spirit of my invention or the scope of my broader claims.

I first illustrate these principles and procedures by a highly desirable ammonium phosphatic base.

*Base of ammonia and phosphate*

A first illustration of the above principles and processes is found in my methods of making mixed fertilizer containing a nitrogen and a phosphate component. In a large proportion of the mixed fertilizers in use today the nitrogen component is secured from ammonium sulphate. This ammonium sulphate is manufactured as a product complete in itself, either as a by-product of the destructive distillation of coal or by passing an ammonia gas through sulphuric acid independently of any other operation. In either case the product contains residual acid which is neutralized by the addition of an acid-consuming material of no fertilizing value so that it becomes a finished material which can be shipped, mixed and handled. Phosphate rock is acidulated with sulphuric acid and likewise processed into a finished article of commerce. Thereupon these two finished products are mixed with each other to furnish a base of ammonia and phosphate.

According to this invention, however, I take an intermediate unfinished liquid-containing sludge resulting from the passing of ammonia gas through sulphuric acid and add phosphate rock to it. The result is a dry, free-flowing product containing both ammonia and phosphorus. Thus I consolidate these two processes into one. Alternatively I may mix this intermediate ammonium sludge with other sludges described herein which contain potash and magnesium oxide. These materials which I thus mix with this intermediate product in turn are themselves intermediate products. Thus by using intermedate aciidic sludges I obtain at low cost multiple fertilizer bases of great value. The acidic component which others waste I employ advantageously.

As is well known to those skilled in the metallurgical, coking and fertilizer arts, ammonium sulphate is a common source of the nitrogen content of completed fertilizers which are sold in the United States and abroad. It is produced as a by-product of coking. In the destructive distillation of coal in order to form coke and gas, a gaseous product containing ammonia as an impurity is produced. Before this gas can be used in steel making or for domestic or other purposes, this ammonia must be removed. This removal is generally accomplished by passing the gas through a bath of sulphuric acid. The result is a heavy sludge containing sulphuric acid and ammonium sulphate including some in the acid form. By an expensive process of concentration and purification, including the use of centrifuges or heat, this sludge is roughly separated into crude ammonium sulphate and sulphuric acid. The sulphuric acid mechanically removed from the sulphate of ammonia is returned to the bath. As a result of any mechanical or heat treatment, it is difficult to remove from the sludge at least the final one or two percent of the acid—that is, an amount of acid which equals in weight on a dry basis that percentage of the weight of the sludge. Consequently, this residual acid must be neutralized, thus at an expense adding a valueless material and wasting the potential of the acid. Also, as sulphate of ammonia comes from the treating tank it contains a portion of acid ammonium sulphate, a portion of which concomitantly with the neutralization of the free acid is changed to the normal salt. If the sludge is treated by a gas such as anhydrous ammonia, the free acid and whatever salt is present is neutralized and plant food is added but at high cost. If limestone or some other neutralizing substance not a plant food is used, the acid is rendered unproductive and a dead weight of adulterating material added.

According to this invention, I take this sludge, which is composed of an ammonium sulphate component and an acid component, just as it comes from a purification bath of a coking process, and immediately use it to produce any one of several fertilizer bases or a complete mixed fertilizer. If a particular mixture is stoichiometric, one of these bases is ammonium phosphate alone (and gypsum) and others are ammonium phosphate in combination with either sulphate of ammonia or superphosphate depending upon the details of the process. The complete fertilizer includes of course potash as well as nitrogen and phosphorus. Production of either concentrated bases upon a 1–1–0 analysis or mixed fertilizers upon a 1–1–1 basis is simple and economical, but any desired ratio varying the phosphorus and potash components may be employed. Both in my co-pending parent application and herein I have defined the word "sludge."

To produce the above results, I permit the ammoniation of the sulphuric acid to proceed only to a desired point, as is simply determined by methods later described, and forthwith add ground phosphate rock as in the various proportions explained or set out below. I then mix the mass in an ordinary pan mixer, place it in the pelleting drum as taught in my said co-pending parent application, and likewise as taught therein dust it preferably in the latter portion of the pelleting operation with ground phosphate rock or other material. As repeatedly stated in my said co-pending parent applications and as illustrated herein as applying to this process including ammonia I generally use as coating an amount of material equal to approximately five percent of the end product. The amount of surface moisture determines the exact quantity used. If the passage of the gas through the bath has been permitted to go far enough so that the mass has crystallized reasonably dry and has been permitted to cool from the so-called molten state, the entire later operation may be carried out in the pelleting drum. The end material is dry and free flowing and may be stored, shipped and drilled within a few hours.

Although I prefer to utilize the entire acidic mass from the purification process, a portion of the acid may be removed therefrom and re-used in the coking operation and the sludge treated as herein described.

It will be noted that even in those cases in which a portion of the acid is used again in a purification bath I completely avoid the expensive steps of purifying the acid which is so reused and also of purifying or neutralizing, as that word is ordinarily used in this art, the mass of sulphate of ammonia. In the mass of sulphate of ammonia and acid as it comes from the purification bath or a subsequent separation operation there are both free acid and an acid salt. I employ this entire acidic component to digest the added phosphate rock and as a result I secure its practically complete utilization in the form of a product which is salable to the farmer. This excess acid which is ordinarily recovered by an expensive process or rendered unproductive is immediately put to work to produce a valuable plant food.

As will be clear from the illustrations which follow I apply the ammonia gas to sulphuric acid of a concentration of 52° Baumé or greater. Previous practitioners have used in this purification process a less concentrated acid thus facilitating the trapping of ammonia gas thereby utilizing in that process more of the acidic component of the sulphuric acid than is possible with a more concentrated acid. As a result, however, expensive mechanical processes have been required to recover or remove the surplus water and adding generally an alkaline and agriculturally valueless material to neutralize the product. My use in my process of gas purification of a relatively concentrated acid is economical and efficient because I dispense with these separation, drying and neutralization steps and apply the entire acidic component cheaply and efficiently to the production of a phosphatic fertilizer in combination and admixture with the sulphate of ammonia. My addition of phosphate rock causes chemical drying of the mass. All of the foregoing will be clear to those skilled in the fertilizer art.

It also should be noted that I do not "dry" the product in the ordinary sense of that word. All but a negligible amount of moisture originally present in the sludge remains as free moisture and water of crystallization yet the end product while not dusty is dry to the touch. This statement is to be taken literally as meaning that identic moisture originally present remains in the end product and not that the amount of moisture (less evaporation) in the end product is the same as that originally present.

The exact procedure which I follow depends upon economic and other practical considerations. For purposes of illustration it may be said that at the end of a sludge-forming operation three quarters of the total content of a sludge thus formed may represent a component of sulphate of ammonia and one quarter of the total an acid component, this acid component comprising sulphuric acid and ammonium acid sulphate. This is the point at which no acid can be removed without the application of power as in a centrifuge. As will be understood by those skilled in the fertilizer art this result of a mass from which no liquid runs requires the use of sulphuric acid of a concentration of the order of 52° Baumé or greater. From the standpoint of the purification of the gas, it is desirable to utilize an excess of acid so that all nitrogen will certainly be trapped. It is entirely practical, however, to stop at a point at which the proportion of the acid component is relatively higher than that represented by the 1:3 ratio stated above. In that case some liquid will flow. The practical limit is that at which there is no loss of $NH_3$ as the gas is fed into the acid bath and no undue expense for manipulation.

The exact method of handling the purification bath is a question of more importance from the standpoint of the by-product operation than of this, except that when fertilizer bases of relatively high nitrogen contents are desired a succession of tanks may well be employed. If fixed closed chambers are used into the bottom of each of which the gas is introduced and from the top of which the purified gas is collected I prefer to use a plurality so that successive batches of the acidic sludge are provided without interrupting the continuity of the purification operation. A convenient method is to provide an inclined pipe (or a plurality of pipes for a larger operation) of considerable diameter into the top of each of which sulphuric acid is introduced. The gas is introduced by means of a relatively large number of small pipes which are connected to the bottom of the larger inclined pipe. A collection chamber or merely an exit pipe may be provided at the upper end for the discharge of the purified gas. As the impure gas bubbles into the pipe it works its way upwardly against the current of the sulphuric acid and the absorption of the ammonia takes place. From the lower end of the larger pipe the sludge is then removed by gravity and used as herein taught. This operation may be practically speaking continuous or a plurality of pipes may be used and the gas shut off from one while the acidic sludge is being discharged. Instead of depending entirely upon gravity for the flow the acid may be pumped downwardly.

Chemical basis for this operation of course rests upon the fact that thirty-four pounds of $NH_3$ are absorbed by 98 pounds of $H_2SO_4$ to produce 132 pounds of sulphate of ammonia. An example of the process to produce a base of 11.25–9.43–0 consists of the use of 1423 pounds of sulphuric acid of 60° Baumé in which there have been absorbed 269 pounds of $NH_3$, making a total mass of 1692 pounds, to which theoretically I add 623 pounds of phosphate rock of 72 percent bone phosphate of lime. As a practical matter, I add approximately 650 pounds because the sulphate of ammonia appears to have an acidulating potential additional to that of the sulphuric acid or of the acid sulphate of ammonia which is secured therefrom.

The above reaction, except for the additional sulphate of ammonia, may be represented by the following formula:

$$2(NH_4HSO_4) + H_2SO_4 + Ca_3(PO_4) = 3(CaSO_4) + 2(NH_4H_2PO_4)$$

Since the above sludge is too moist to be handled directly through the pelleting drum I first introduce it into an ordinary pan mixer and add all but 120 pounds of the phosphate rock, this amount representing five percent of the total, as is my practice. After from one-half to two minutes, depending upon the type of mechanisms employed, I pass the mass into a pelleting drum and add the remainder of the ground phosphate rock as the drum revolves but later in the pelleting operation. Between the mixing and pelleting operations, the mass may be permitted to crystallize for a few minutes so that it enters the pelleting drum somewhat dried thereby making it possible to produce pellets of a desired small size. The result is a pelleted product which can be shipped almost immediately but I prefer to store it for a few days. It will be completely dry and free flowing and not hydroscopic at the end of that period. As stated in my said co-pending parent application the "drying" is accomplished almost entirely by the utilization of the original free moisture as water of crystallization. At no time do I apply any external heat or other dehydrating agency. At the end of a pelleting operation I retain as free moisture and water of crystallization all of the total moisture and the identic total moisture which was present at the beginning thereof. I therefore use the term "without dehydration" in the claims in its ordinary dictionary meaning of "without loss of moisture." I do not mean that I lose moisture and then replace it.

Method of determining amount of phosphate rock or the like to be added

In order to determine the amount of the phosphate rock to be added to the acid ammonium sludge, and also to the potassium and other products described and claimed herein, I have found useful a simple titration by sodium hydroxide. For convenience I generally use a 10% solution of NaOH, but all figures herein are on the basis of sodium hydroxide. One gram of sulphuric acid of 60° Baumé of a type commonly used in the fertilizer industry is neutralized by .64 gram of NaOH. By the use of NaOH, I make a determination which with calculations based thereon enables me instantly to determine the amount of a particular phosphate rock which I am about to use which is required effectively to utilize the acid component of the ammonium (or other) sludge. In the case of a particular phosphate rock of 72% B. P. L., which throughout this specification I employ in all illustrations of the practice of this invention requiring phosphate rock, I find that one gram of $H_2SO_4$ of 60° Baumé will acidulate 1.472 grams of this rock, provided the processes hereof and of my co-pending parent application are employed. As will of course be understood by those skilled in this art when these figures are reduced to a tonnage basis they yield 850 pounds of sulphuric acid calculated at 60° Baumé to 1250 pounds of phosphate rock at 72% B. P. L. According to conventional processes of making superphosphate, a smaller quantity of rock would be required since less efficient use is made of the acid. By dividing 1.472, which is the measure of the sulphuric acid required to convert the unavailable $P_2O_5$ of that particular rock to an available form, by .64, which is the measure of the neutralizing value of NaOH as applied to $H_2SO_4$, I secure a factor of 2.3 which represents the amount of that particular phosphate rock which will be required in comparison with sodium hydroxide to utilize a given acidic component. For convenience I hereafter apply the term "acid-rock factor" to this factor. This factor indicates that 2.3 times as much phosphate rock as sodium hydroxide must be applied to a given sludge to utilize the acidic potential thereof. By securing the acidulation potential by the use of NaOH of the ammonium sulphate sludge or other material which I propose to use and multiplying that figure by this acid-rock factor I immediately find the amount of phosphate rock which must be employed completely to utilize the acidic potential of the sludge. In this example according to the above method of titration I require .16 gram of sodium hydroxide to neutralize one gram of the ammonium sulphate sludge. For convenience herein I call this figure the "NaOH factor." Therefore by multiplying 2.3 (acid-rock factor) by .16 (NaOH factor) I secure .368 which indicates the amount of phosphate rock in grams which is required completely to utilize one gram of the acidic sludge. For convenience I call this factor the "rock-requirement factor." That is to say, the acidulation potential of one gram of ammonium sulphate sludge will be completely employed by the addition of .368 gram of this particular phosphate rock. Since I am employing 1692 pounds of sludge I multiply that figure by .368 and use 623 pounds (theoretically) of phosphate rock. Practically I make use of from two to four percent more than the theoretical amount of rock for the reasons stated elsewhere herein. As a practical matter, I find it convenient to add this allowance to the ultimate acid-rock factor by increasing it by, say, .2. Thus if the theoretical acid-rock factor is 2.3, I increase it to 2.5 to obtain the acid-rock factor which is actually employed.

The following table will make clear the characteristics important to this invention of one ton of ammonium sulphate sludge containing various amounts of acidic components:

| | | | | | | | |
|---|---|---|---|---|---|---|---|
| (1) NaOH—Test | .08 | .10 | .12 | .14 | .16 | .18 | .20 |
| (2) Percent acidity | 12.5 | 15.625 | 18.75 | 21.875 | 25 | 28.125 | 31.25 |
| (3) Rock requirement factor | .20 | .25 | .30 | .35 | .40 | .45 | .50 |
| (4) Rock required, pounds | 400 | 500 | 600 | 700 | 800 | 900 | 1,000 |
| (5) Acid component, pounds | 250 | 312.5 | 375 | 437.5 | 500 | 562.5 | 625 |
| (6) Salt, pounds | 1,750 | 1,687.5 | 1,625 | 1,562.5 | 1,500 | 1,437.5 | 1,375 |
| (7) Percent N | 18.37 | 17.71 | 17.06 | 16.40 | 15.75 | 15.09 | 14.44 |
| (8) Pounds N | 367.4 | 354 | 341.2 | 328 | 315 | 301.8 | 288.8 |

The following explanations correspond to the left-hand headings as numbered above:

(1) NaOH factor: actual determination in terms of a gram of sodium hydroxide necessary to neutralize one gram of a given sludge of ammonium sulphate.

(2) Ratio in percent of acidity of a given sludge to that of $H_2SO_4$, 60° Baumé.

(3) Rock-requirement factor to be applied to the sludge (in these instances one ton) to determine the amount of phosphate rock of the predetermined type (in this case 72% B. P. L.) which must be applied to utilize the acidic component of the particular sludge.

(NaOH factor) × 2.5 = (rock-requirement factor)

2.5 being the acid-rock factor adjusted from 2.3 as above stated.

(4) Rock required is the above factor applied to 2000 pounds of sludge.

(5) "Acid component" represents the acidic component of a ton of sludge in terms of sulphuric acid. That is to say, each ton has an acidulating potential equivalent to that of the given number of pounds of $H_2SO_4$, 60° Baumé.

(6) "Salt component" represents neutral sulphate of ammonia $(NH_4)_2SO_4$.

(7) A nitrogen content of 21%, which is the basis of this figure, is representative of my product. Ordinary commercial sulphate of ammonia, which has a nitrogen content of 20.5%, is adulterated by material added to neutralize the free acid as well as the usual impurities.

(8) The nitrogen component of the sludge expressed in pounds.

The foregoing table represents the quantities of sludge and phosphate rock which must meet to secure the stated results. The following table corresponds, but shows the cured products after the sludge and phosphate rock have been combined.

| | | | | | | | |
|---|---|---|---|---|---|---|---|
| (1) NaOH | .08 | .10 | .12 | .14 | .16 | .18 | .20 |
| (2) Lbs. sludge | 2,000 | 2,000 | 2,000 | 2,000 | 2,000 | 2,000 | 2,000 |
| (3) Lbs. rock required | 400 | 500 | 600 | 700 | 800 | 900 | 1,000 |
| (4) Lbs. total | 2,400 | 2,500 | 2,600 | 2,700 | 2,800 | 2,900 | 3,000 |
| (5) Lbs. N content | 367.4 | 354 | 341.2 | 328 | 315 | 301.8 | 288.8 |
| (6) Percent N content | 15.30 | 14.16 | 13.12 | 12.15 | 11.25 | 10.41 | 9.63 |
| (7) Lbs. $P_2O_5$ content | 132 | 165 | 198 | 231 | 264 | 297 | 330 |
| (8) Percent $P_2O_5$ content | 5.50 | 6.60 | 7.61 | 8.55 | 9.43 | 10.24 | 11.00 |

The following explanations correspond to the left-hand headings as numbered above:

(1) NaOH factor: actual determination of fraction of a gram of sodium hydroxide to neutralize one gram of a given sludge.
(2) Pounds of ammonium sulphate sludge employed.
(3) Pounds of phosphate rock to utilize the acid component of the sludge at the various stated degrees of acidity.
(4) Represents the amount of finished product when cured.
(5 to 8 inclusive) Represents the N and P components respectively in finished cured products.

The above table shows at a glance how far the ammoniation of the sulphuric acid should be allowed to proceed to yield any desired base—that is, any desired ratio of nitrogen to phosphorus. For example, if an operator wishes a base of approximately 13.12–7.61–0 he permits the ammoniation to proceed until the sludge tests .12 by the above method. If, however, a base relatively low in nitrogen and high in phosphorus is required, such for example as one of 9.63 N and 11.00 P₂O₅, the ammoniation should stop at the early point at which the NaOH test shows .20.

It will of course be understood that the above tables are purely illustrative, and that they represent only a very few of the many possible products. Without extensive equipment, the upper limit of nitrogen is about that represented by a sodium hydroxide test of .08. The lower theoretical limit is that represented by an OH factor of .64 which is that of a commercially pure sulphuric acid of 60° Baumé, which has absorbed no ammonia gas.

*Intermediate ammonium base*

From the commercial and practical standpoints one important element of this invention consists in the possibility which it offers to carry out only a portion of the foregoing process at a by-product coke plant where gas is purified. Instead of carrying the process to completion at such a plant, it is practicable and economical to add to the sludge as it comes from the purification bath merely enough phosphate rock so that the mass is such that it can be shipped to a fertilizer mixing plant thereby forming what for convenience I call an "acid base" since it has an acidic potential which must later be utilized by the addition of phosphate rock. As a consequence, the fertilizer operation does not need to be carried out at the by-product coke plant and it is not necessary to ship to that plant more than the relatively small amount of the ground phosphate rock which is required for the above purpose.

The exact amount of ground phosphate rock to be used of course depends upon the liquidity of the sludge as it comes from the purification operation. Under these circumstances, however, it is desirable to permit the purification process to go to its practicable and economic limit in order to reduce to a minimum the amount of phosphate rock which must be shipped to the coking plant and as far as possible to centralize in a fertilizer plant the fertilizer phases of production. For purposes if illustration it may be assumed that two thousand pounds of sulphate of ammonia sludge has a NaOH factor of .08 and a nitrogen content of 18.37. The addition of 100 pounds of ground phosphate rock having acid-rock factor as stated above of 2.3 adjusted to 2.5 because of the acidulation potential of ammonium sulphate will be sufficient to render the sludge practical and acceptable for shipment. The resulting mixture in fertilizer terms will have an analysis of approximately 17.50–57–0 and a rock-requirement factor of .0571. As this material arrives at the fertilizer plant multiplication of this factor of .0571 by 2.5 will indicate that 300 pounds more of ground phosphate rock should be added. The result will be 2400 pounds of a base of approximately 15.3–5.5–0. It will be understood that 100 pounds of phosphate rock will have been shipped from either Florida or Tennessee to the coking plant and 2100 pounds of acid sludge and rock shipped to the fertilizer plant, this 100 pounds representing the only material upon which there could possibly be any freight additional to the minimum.

The following table, which in general corresponds to those above, presents the important characteristics of the above-described incomplete or intermediate base:

| | | | | | | | |
|---|---|---|---|---|---|---|---|
| (1) NaOH factor, sludge | .08 | .10 | .12 | .14 | .16 | .18 | .20 |
| (2) Lbs. sludge | 2,000 | 2,000 | 2,000 | 2,000 | 2,000 | 2,000 | 2,000 |
| (3) Lbs. rock required | 100 | 125 | 150 | 175 | 200 | 225 | 250 |
| (4) Total | 2,100 | 2,125 | 2,150 | 2,175 | 2,200 | 2,225 | 2,250 |
| (5) Lbs. N content | 367.4 | 354 | 341.2 | 328 | 315 | 301.8 | 288.8 |
| (6) Percent N content | 17.50 | 16.66 | 15.89 | 15.08 | 14.32 | 13.56 | 12.83 |
| (7) Lbs. P₂O₅ content | 33 | 41.25 | 49.5 | 57.75 | 66.0 | 74.25 | 82.50 |
| (8) Percent P₂O₅ content | 1.57 | 1.94 | 2.30 | 2.65 | 3.00 | 3.34 | 3.67 |
| (9) NaOH factor intermediate | .0577 | .07058 | .0836 | .0965 | .1091 | .1213 | .1334 |
| (10) Rock factor | .14275 | .17645 | .209 | .241 | .2727 | .303 | .3335 |
| (11) Lbs. additional rock required | 300 | 375 | 450 | 525 | 600 | 675 | 750 |

The following explanation corresponds to left hand headings as numbered above:

(1) The NaOH factor of the sludge originally employed at the coking plant.
(2) The ammonium phosphate sludge employed.
(3) The phosphate rock to be added at the coking plant to make the material acceptable for shipment.
(4) Total weight of batch shipped from coking plant to the fertilizer plant.
(5–8 inclusive) Represents the N and P components as stated in the intermediate product as shipped to the fertilizer plant.
(9) The NaOH factor of the intermediate base as received by the fertilizer plant whereat it is to be converted into a finished product.
(10) Rock-factor, which is the figure of line 9 multiplied by the acid-rock factor of 2.5, which indicates the acid consuming capacity of the phosphate rock.
(11) The amount of additional phosphate rock which must be applied by the fertilizer manufacture to the particular batch of the base as produced in the coking operation, which is the figure of line 4 multiplied by that of line 10.

The importance of this phase of the invention will be evident when it is considered that freight makes up a large part of the cost of the fertilizer to the farmer. Consequently the back haulage to a point of mixing and distribution of other fertilizer constituents additional to these relatively few pounds of rock is avoided.

The above description has been limited to the making of a two-part base, but potash may be added thereby producing a complete mixed fertilizer. For example, I may take 2625 pounds of sludge of a NaOH factor of .2 as stated above, add 1112 pounds of ground phosphate rock and 667 pounds of muriate of potash, place the mixture in a pelleting drum, and add an additional 200 pounds of ground phosphate rock for coating as described and claimed in my said co-pending application. The result is a complete mixed fertilizer of an approximate analysis of 8.2–9.5–8.7.

An example of a complete fertilizer on a 1–1–1 basis is as follows: To make an analysis of 8-8-8 I may use 1070 pounds of sulphate ammonia sludge (15.09% N) of a sodium hydroxide factor of .18, 381 pounds of ground phosphate rock, 267 pounds of muriate of potash, and 112 pounds of filler, which may be ground phosphate rock in such sections as that material is inexpensive, or my novel gypsum sludge. To this mixture in order to secure moisture for optimum pelleting and drying, I add 70 pounds of water and revolve in a pelleting drum to which in a late stage I add 100 pounds of additional ground phosphate rock as a coating material. If the gypsum sludge is employed, 182 pounds should be used and the water eliminated since the gypsum sludge is a moist product. Since there is no evolution of gases and the moisture goes into water of crystallization the shrinkage will be slight, approximately a ton of cured fertilizer resulting from the use of the above formula. There are certain conditions under which a complete fertilizer of this low grade is needed but ordinarily I prefer greater concentration.

It is particularly to be noted that according to this process by the acidulation of phosphate rock I have produced a phosphatic base of a type ordinarily made from superphosphate but without the use of superphosphate. As known to those skilled in this art, the ordinary method of producing superphosphate, which is a calcium phosphate, is to mix ground phosphate rock and an acid, place the resulting mixture in a receptacle known as a den, remove it therefrom, place it in a large pile, and cure it for a period of from three weeks upwardly, preferably re-piling frequently to prevent overheating. Then, the cured superphosphate is mixed with a completed sulphate of ammonia with or without the addition of other materials. According to my process, in addition to avoiding the completion of the sulphate of ammonia I do not produce a cured superphosphate or indeed superphosphate at all. I avoid the mixing, denning, ex-denning and long curing steps. My process is essentially one of dry-mixing, and, except in those cases in which I use a very wet mixture, after the addition if necessary of a pelleting drum can be carried out in present plants equipped for the dry mixing of fully prepared materials.

One great advantage of this process is that at no point is there any noticeable volatilization. I secure as an end product a mixed fertilizer which is ordinarily made from superphosphate but during the entire process I avoid heat. The fluorine of the original phosphate rock remains largely in the end product, but its presence in the fertilizer is not harmful because I avoid during the curing period the conditions which by many are thought to cause the fluorine to recombine with the available phosphate to revert it. It will be understood that while in my parent application I most emphatically teach the absence of heat or other form of dehydration from the period of ex-denning onwardly in this application I go a step further and avoid heat in the processes which take the place of those normally precedent to the placing of the material in the den.

The pelleted mixed fertilizers or bases, whether of ammonium phosphate or of potassium phosphate or of potassium phosphate or of both, which result from the practice of this phase of this invention, include gypsum. They have many advantages over similar products as previously made so far as I am aware. All of the reactions, whether in bases or mixed fertilizers, are substantially completed almost immediately. This completion and the presence of the gypsum results in a pellet which is and remains dry and free-flowing and is not in the least hydroscopic. The phosphorus component has the greatly improved crop-producing capacity of that which is described and claimed in my said co-pending application Serial Number 432,350, which on March 27, 1956, matured as Patent Number 2,739,886. All of these advantages I believe to be unique.

In order that the advantages of the above continuous and inexpensive process may be fully understood, the conventional steps for accomplishing the same ends will now be stated:

To secure sulphate of ammonia, the ammonium-sulphate-sulphuric-acid sludge, which without any modification I use as one of my two major materials, is subjected to expensive processing which removes from the sludge the maximum amount of unconsumed sulphuric acid for re-use in the coking operation and yields crude ammonium sulphate after the unremoved acid has been neutralized. Thus one fertilizer product is formed which later will be mixed dry with superphosphate to form a nitrogen phosphatic base or fertilizer. Superphosphate is formed by mixing ground phosphate rock with an acid, pouring the resulting mixture into a receptacle known as a den, removing it therefrom and storing it in a large pile, preferably with repeated movements by a crane to prevent over-heating, for approximately sixty days until the sulphuric acid has converted the crude phosphates of the rock into phosphates which in fertilizer terminology are "available" for use by the plant—that is in citrate-soluble form. Alternatively and preferably the improved method of making superphosphate described and claimed in my said co-pending parent application may be employed. In any event, however, a second dry cured and completed product is formed and cured. Thereafter these two finished products are dry mixed and then given another extended period of cure. According to this invention, one simple operation takes the place of the three separate operations of the prior art and one very short curing operation is all that is necessary.

From the above description the great advantages and savings of the above described process will be understood. By the above described operation I am able to produce much more simply than superphosphate alone can be made by conventional processes a product—ammonium phosphatic fertilizer including gypsum—which in effect is a chemical combination of ammonium sulphate and superphosphate.

I next illustrate my invention as applied to a base of potash and a phosphate, low in chlorine or chlorine-free.

*A potash-phosphate or potash-soluble magnesium base*

As is well known to those skilled in this art, many agronomists consider potassium sulphate much more desirable than potassium chloride as a fertilizer. In the United States a large part of all potash as mined and prepared for market is in the chloride form, as KCl plus impurities, which by acidulation with sulphuric acid can be converted into the sulphate form, $K_2SO_4$. For certain crops, notably tobacco, there is a great demand for a fertilizer which is either chlorine-free or contains no more than 40 pounds of chlorine per ton of fertilizer, an amount, however, which by some growers is considered to be desirable rather than deleterious. The demand for a low chlorine potash fertilizer springs in large part from the fact, admitted by almost all soil scientists in a subject which is controversial, that chlorine compounds, practically all of which are water-soluble, in a process of double decomposition unite in the soil with other and valuable elements, such for example as buffer materials and many of the so-called minor elements, the buffer materials and the minor elements thereby being leached out. Other soil scientists object to chlorine in large quantities for its possible harmful action upon beneficial bacteria. In any event, experience has shown that the productiveness of fields which have been treated for a few years with fertilizers containing heavy applications of chlorine is greatly diminished.

As a consequence of these factors the value as of the date of filing of my said parent application which can be commercially assigned to potassium sulphate carrying 48 percent $K_2O$ is much greater than that for potassium chloride carrying 60 percent $K_2O$, namely $42 and $34 per ton respectively. When the two substances are reduced to a unit basis of potassium oxide, that in the sulphate form may be considered to be valued at 87 cents per unit as compared to 67 cents per unit for the chloride. In spite of this high differential in price and the undoubtedly greater value of the product in the sulphate form, the amount of sulphate of potash which is offered for sale in comparison to the muriate is very small because of the high cost of converting the muriate of potash into the sulphate form. Under normal conditions, however, a large amount of sulphate of potash is imported. Prior to the second World War on a ten year average annual period German imports amounted to slightly less than 70,000 tons, not including a small amount of sulphate of potash-magnesia.

According to this invention I am able to make use of existing muriate of potash and at low cost and with high efficiency convert it into a high grade potassic phosphatic base in which the potash is either "chlorine free" as later defined or sufficiently low in chlorine to meet the demands of the trade and the requirements of the large majority of scientists. The retention of some chlorine meets a need generally considered to exist for chlorine even in a tobacco fertilizer.

The conversion of potassium chloride to a normal salt of potassium sulphate by double decomposition by sulphuric acid and high heating has long been known, but has been practiced to a limited extent owing to its relatively high cost. Hydrochloric acid has been produced as a by-product of this operation, which is represented by the following formula:

$$2KCl + H_2SO_4 + heat = K_2SO_4 + 2HCl$$

It has also been known that potassium chloride may be similarly converted to potassium bisulphide by sulphuric acid and high heating, the formula being $$KCl + H_2SO_4 + heat = KHSO_4 + HCl$$

In a conventional process, sulphuric acid calculated at 100 percent is added to the potassium chloride in that order and at the rate of two parts of weight (20 mols) of sulphuric acid to three parts by weight (40 mols) of potassium chloride to produce the normal salt. It has been common to consider this decomposition as taking place in two stages although as a matter of fact it does not. According to this assumption in a theoretical first stage involving half of the potassium chloride and all of the acid $KCl + H_2SO_4 = KHSO_4 + HCl$. During this so-called stage and as the result of vigorous stirring and without the addition of external heat evolution of approximately 50 percent of the total chlorine may perhaps be achieved. Thereafter in what has been spoken of as the second stage, which is represented by the equation $KCl + KHSO_4 = K_2SO_4 + HCl$. Some authorities have recommended high heat of from 500 to 600 degrees centigrade for from twenty minutes to three hours or longer, or less heat for more than proportionately longer periods. This high heat and consequently necessarily low production are factors which contribute to the high cost of the conventional process. In this so-called second stage the remainder of the chlorine is theoretically driven off. While the above equations and "stages" may satisfactorily explain the chemistry of the process, I have found that as a practical matter the two stages are largely concurrent. It is also true that in conventional practice anywhere from three to seven or eight percent of the chlorine originally present remains in the mass. Consequently it is customary to speak of a mass containing this amount of chlorine as "chlorine-free."

My processes are fundamentally different. I rely upon a large surplus of sulphuric acid instead of heat and long stirring to drive off the chlorine and then profitably employ the surplus acid to acidulate phosphate rock, or, as later stated, dolomitic limestone. Although it has long been known that some chlorine is removed from potassium chloride upon contact of sulphuric acid therewith all previous practitioners known to me have found long continued high heat and continued stirring to be necessary to remove all the chlorine and also sufficient of the chlorine to result in a product merchantable as a low-chlorine product. I have discovered, however, that by the use of excess acid without any external heat whatsoever and with limited stirring I can drive off substantially the same amount of chlorine, namely about 94 percent, as others do with such high heat and long mixing. As set out in my said co-pending parent application Serial Number 450,324, I found it advantageous to apply sulphuric acid to potassium chloride in an amount greater than that necessary to produce a normal salt. I have now discovered that it is highly desirable to apply to potassium chloride an amount of sulphuric acid greater than that necessary to produce an acid salt. In the first instance as taught in my parent application I employ more than one mol of acid to each two mols of potassium chloride and in the second and preferred instance I employ more than one mol of acid to one of potassium chloride. In my preferred process I always produce $KHSO_4$ with free $H_2SO_4$ often with a slight mixture of $K_2SO_4$. I wish to emphasize that I utilize all of this excess acid. As will later appear in carrying out my processes I much prefer to add a very large surplus of acid over that necessary to produce the acidic salt but I have found that that amount is the most practicable lower limit although under conditions I can use an amount of acid, as taught in my said co-pending parent application, between that sufficient to form the normal salt and that sufficient to form the acidic salt.

I have found that it is necessary to use sulphuric acid of a concentration of 60 degrees or greater to remove chlorine efficiently without the use of external heat. If I apply such acid of a concentration of 60 degrees to the potassium chloride in an amount in excess of that required to produce an acid salt I have sufficient moisture remaining efficiently to acidulate the amount of phosphate rock which is necessary to add to make use of this acidic component. I calculate this amount of rock in accordance with the simple titration elsewhere herein stated. If I employ an acid of a concentration greater than 60 degrees there may be insufficient moisture. In that case before I add the phosphate rock I add sufficient water to produce the concentration to any desired point between 52 and 60 degrees Baumé, because within this range as is well known in the fertilizer art it is practicable to acidulate phosphate rock and form superphosphate.

I have discovered that most effective results in the removal of chlorine can be achieved by the use of a large excess of sulphuric acid over that required to form the acidic salt. By the use of the ratios of acid to potassium chloride later stated I have found that without any external heat or stirring for more than a few moments I may remove any desired amount of chlorine up to about 93 percent of the total, which is the best figure achieved by others known to me even though they use long continued high heat and stirring for many hours. Generally speaking the greater this excess the more efficient the operation, up to the point at which the amount of phosphate rock necessary to make use of the acidic component results in a too great disparity between the phosphatic and potassic components of the final fertilizers. If I limit myself to the amount of acid in the range between that necessary to form a normal and an acidic salt I find that the reaction is relatively slower and less efficient and also at the conclusion of the first mixing stage I am faced with a problem of moisture since there is in the mixture too little moisture to acidulate readily the phosphate rock to be added. If therefore I add more than the sulphuric acid necessary to produce the acidic salt no problem of moisture exists as applying to the second mixing operation.

In my process, the greater the ratio of $H_2SO_4$ to KCl the greater the ratio of HCl driven off to the original KCl without the application of any heat. For example if 100 grams of $H_2SO_4$ calculated at 60 degrees Baumé are applied to 60 grams of KCl 21.28 grams or 75 percent of the total are evolved. If 100 grams of $H_2SO_4$ are applied to 30 grams of KCl 11.35 grams of chlorine or only 80 percent of the total will be driven off. If 100 grams of sulphuric acid are applied to 10 grams of potassium chloride 4.4 grams of chlorine will be evolved or 93 percent of the total, without the application of for high heat and stirring over a period of five hours. My product can be used within a day or so after ordinary sizing.

I am also aware that the introduction of live steam (or alternatively air blasts or the use of a vacuum) also however always with high heat may decrease the extent of the stirring which is required.

The following table will clarify the examples which I am about to present:

| $H_2SO_4$ (60°) | KCl | Total Cl | Cl removed | | Acid consumed | Acid unused | Rock used | $P_2O_5$, percent | $K_2O$, percent |
|---|---|---|---|---|---|---|---|---|---|
| | | | Lbs. | Percent | | | | | |
| 100 | 10 | 4.73 | 4.4 | 93 | 7.92 | 92.1 | 138 | 18.9 | 2.5 |
| 100 | 30 | 14.19 | 11.35 | 80 | 20.43 | 79.57 | 119 | 16.7 | 7.7 |
| 100 | 60 | 28.88 | 21.28 | 75 | 38.34 | 61.66 | 92.5 | 13.7 | 16.1 | heat. The above results, although based on repeated tests, are approximate, since I have used commercial grade materials, which vary in composition, such as are used by the fertilizer industry. Details of mixing operations including volume introduce other variables but do not obscure the consistency of the results or the validity of the principles.

The ratio of sulphuric acid to potassium chloride to be used is determined by three factors: Percentage of potash desired; percentage of phosphorus desired; and the maximum percentage of chlorine permitted in the finished product. Since all of the acid which is not removed in the evolution of hydrogen must be utilized to form available $P_2O_5$, or magnesium sulphate as later stated, the amount of those constituents which are desired in a finished product determine the limitations of my process. I have found that these limitations are of no practical importance since with a comparatively few exceptions my base meets wide-spread established needs. By the complete practice of my invention I cannot supply a fertilizer which contains less than 8 percent of $P_2O_5$ (or $P_2O_5$ and other acidulated material) and more than 10 percent of potash and less than 1½ percent of chlorine. I can meet a formula having only two of these limitations.

I am aware of the ancient wet mixing process wherein various fertilizer ingredients were placed together under conditions of moisture. Some of these earlier practices, all of which so far as I know have long been given up, included the simultaneous mixing of phosphate rock or other source of $P_2O_5$, sulphuric acid and potassium chloride. The greater part of the sulphuric acid, however, immediately united with the phosphate rock and was utilized in the acidulation reaction leaving little available to drive off chlorine. It is well known to practitioners in this art that the reaction between sulphuric acid and phosphate rock is much more quick than the reaction between sulphuric acid and potassium chloride. I do not add phosphate rock until the predetermined amount of chlorine, whatever it may be for a particular formula, has been removed. My invention is not concerned with the mere evolution of chlorine from potassium chloride and its immediate re-combination with ammonia or phosphate. I am concerned only with its removal from the mass.

I am aware that previously it has been proposed to produce a "chlorine-free" product by mixing potassium chloride with sufficient sulphuric acid to form an acid salt and continuously stirring for two hours without heat and three hours thereafter with the use of heat of 240 degrees to 400 degrees F., the resulting bisulphate being used to acidulate powdered dolomite. Even so, about 5 percent of the chlorine remains. This product is not ready for use for from one to two weeks and must be disintegrated. I remove about the same amount of chlorine by substituting excess acid, and a few minutes (five to ten depending on mechanisms used) and stirring All values except as noted are in pounds.

A base of 0-14-15 with only 2½ percent of chlorine is illustrative of my process. Such a base combined with a nitrogen-bearing material to furnish a complete fertilizer would give a formula of X-8-8.5, with a chlorine content of 1.3, the above base making up 1300 pounds of the ton and the nitrogen component and filler the balance.

After having chosen the proportions of sulfuric acid and potassium chloride in accordance with the above considerations, I add the acid, preferably warm, to the KCl and stir vigorously. The hydrogen chloride gas as driven off is forced through a water bath in the conventional manner thereby forming hydrochloric acid.

The sludge produced as the basis of said 0-14-15 formula contains primarily $KHSO_4$ and $H_2SO_4$ with some $K_2SO_4$ and a slight amount of HCl which has not been completely removed as well as the KCl from which the Cl has not been evolved. I then determine the amount tion test which I describe herein in connection with my process for producing my phosphatic ammonium base, which when mixed with this acidic sludge will result in a reaction which produces calcium sulphate, potassium phosphate and mono-calcium phosphate (defined in my said parent application). It will be understood, therefore, that as in the other forms of this basic invention I employ the acid component of the sludge to acidulate phosphate rock thereby producing a low chlorine potassium phosphatic base, much of the hydrogen chloride having been evolved and removed. The probable chemical action is reaction between the acid potash salt and phosphate rock to produce potassium phosphate and gypsum and between the free acid and the phosphate rock to produce superphosphate.

The addition of the phosphate rock to the mixture makes efficient and economical use of the acid component and serves another useful purpose as a pelleting agent which completely and profitably neutralizes any remaining free acid. In conventional commercial operation, it is impossible or at least impracticable to remove all of the free acid and consequently, according to certain conventional practices, the mass is neutralized by the addition of an alkali which adds dead weight but nothing productive. Therefore the quantity of phosphate rock which I add utilizes whatever free acid remains, as well as all of the acidic salt. All acid potentials are profitably employed and no waste materials are added.

I prefer to pellet my product as taught in my said copending applications Serial Number 432,350, which on March 27, 1956, matured as Patent Number 2,739,886, and Serial Number 450,324. If so, I pass the sludge of this first or chlorine-removing mixture together with the major portion of the phosphate rock or other material with which I profitably conserve this acid potential immediately to a pelleting drum. I revolve the mass upon itself and in a late stage add the remaining or minor portion of the rock or other material, which makes up about five percent of the end product. This minor portion adheres to the surface of the pellets and by chemical action dries them and renders them non-coalescent. Heat and other forms of dehydration are avoided. Since the moisture in this second or superphosphate stage is carefully regulated to supply that necessary for the water of crystallization the result is a product of which the calcium phosphate is completely hydrated.

The following example illustrates this process:

To 880 pounds of muriate of potash I may add 1512 pounds of sulphuric acid (60° Baumé at 60° F.) stirring vigorously during and after the addition of the acid. Upon the evolution of hydrogen chloride as a gas to the amount of 300 pounds I add 1325 pounds of phosphate rock (72 percent bone phosphate of lime) and mix in a usual way as if I were making superphosphate. Approximately 75 percent of the chlorine has been removed. After thorough mixing the product is run through a revolving pelleting drum and in a late stage 175 pounds additional of phosphate rock added as coating. I determine the total amount of phosphate rock to be added by the above mentioned sodium hydroxide method. After a few hours, the product is sufficiently dry to ship, but the availability of the phosphorus will increase in a few days. The resulting product, the formula of which is 0–14–15, is a mixture of potassium phosphate, calcium phosphate, together with about 110 pounds of muriate of potash, and calcium sulphate, all but a small part of the water previously in the form of free moisture having been taken up as water of crystallization thereby having dried the mass. The result, therefore, of the foregoing process is approximately 850 pounds of salable hydrochloric acid of 20° Baumé and 3500 pounds of fertilizer base 0–14–15 which contains only approximately 2½ percent of chlorine. The margin of profit in the production of such a base is very high. If as I much prefer this base is handled after the mixture of the phosphate rock without heat or dehydration the phosphatic component will have the peculiar crop-producing capacity described and claimed in my above mentioned co-pending application Serial Number 432,350, which on March 27, 1956, matured as Patent Number 2,739,886. In that application I make clear that in the creation of calcium superphosphate substantially all of the identic moisture which is present at the start of the pelleting operation must be retained in the end product in its original crystalline combination. I obtain the complete hydration of the calcium phosphate and not complete hydration of the other constituents.

It will be noted that in the above operation, I have used 1500 pounds of phosphate rock which under conventional practice would be acidulated by 1110 pounds of sulphuric acid at 60° Baumé. Subtracting this theoretical amount from the 1512 pounds actually used it would appear that 402 pounds of sulphuric acid of 60° Baumé had been used to produce 300 pounds of 100 percent hydrochloric acid. Theoretically, however, 525 pounds of such acid must be used to produce 300 pounds of hydrochloric acid, although practically in the conventional operation the results are considerably less. Such an apparent chemical impossibility is accounted for by the fact that by the processes of my said application Serial Number 432,350, which on March 27, 1956, matured as Patent Number 2,739,886 I am able to cause a given amount of sulphuric acid to acidulate a greater amount of phosphate rock than is possible under any other procedure known to me. Thus I save more than 123 pounds of acid out of 1512.

When potassium chloride is acidulated in order to create sulphate of potash and hydrochloric acid it is desirable to use what from the fertilizer standpoint is a concentrated sulphuric acid—namely 60° Baumé as stated above. When the ground phosphate rock is added to a sludge such as that stated above there may be insufficient moisture to assure good contact. For example, when I have taken 875 pounds of the above described sludge and add 1312 pounds of ground phosphate rock to it I have secured a potassium phosphate base which is not dry and free-flowing after completion of the mixing operation. In order to "dry" such a mixture and to further the reaction I included therein 50 pounds of water. This additional moisture permits the reactions quickly to take place and almost immediately gives me a dry granular and free-flowing product of which after twenty-four hours the water-extractable $P_2O_5$ is 14 percent.

Another base according to this invention, represented by 0–8–32, may be made by mixing 1312 pounds of potassium chloride with 830 pounds of sulphuric acid of 60° Baumé and adding 600 pounds of ground phosphate rock. This base contains approximately 12 percent of chlorine, slightly over half of the original having been removed. The entire operation is one of mixing damp rather than plastic materials. At no time does the mass flow. The original potash crystal largely determines the physical characteristics of the base. After mixing, the mass is passed through a screen to remove the few large particles, and after a few hours is ready to ship, although the availability of the phosphorus will gradually increase.

In connection with my previous statements that I use a warm acid, those skilled in the actual practice of the fertilizer art will understand that sulphuric acid in order to flow and reach all of the particles of rock must be of sufficiently high temperature, from 60° to 70° F. This heating is generally secured by adding water to a concentrated acid. This minor heating of one constituent, which is an instantaneous operation, is not to be confused with the practice of others wherein they apply, from an outside source such as a furnace, a very high heat say of 250° to 600° F. to an entire mass for a period of up to five hours.

From the above examples it will be noted that no provision is made for placing the mixture in a den. None is needed. The mixing and sizing operations alone are sufficient to produce a product which in a comparatively few hours is ready for sale or use.

My addition of an excess of sulphuric acid to the mass to be reacted does not increase the heat to a point greater than that reached by the addition of merely enough acid to form a stoichiometric mixture. Heat is caused only by reaction; not by the presence of idle acid. Chlorine is removed in my process by acid action. Evolution of chlorine does not raise the mass to the boiling point. In fact, the further I increase the ratio of acid to KCl the less the temperature of the mass. In this first stage before the addition of the phosphate rock some slight evaporation of moisture does take place, particularly if the temperature of various ingredients is markedly different, owing for example to conditions of storage as in the winter.

Previously herein I have said that I use sulphuric acid of a concentration of 60 degrees or greater efficiently to evolve chlorine without the application of external heat. If acid of less concentration is employed a larger portion of the chlorine will be trapped by the water. The long application of high heat with continuous stirring will boil out this trapped chlorine or if heat is applied early perhaps prevent its entrapment. The relatively greater efficiency of my method is obvious.

I may well apply to this purpose my novel practice of coarse and fine grinding. As elsewhere herein explained at length, I separate ground phosphate rock (or other material) into coarse and fine particles, for example ground so that 60 percent passes through a 100 mesh screen and 40 percent does not. The coarse particles are then applied to the entire acidic mass and stirred and then the fine added. If I pellet I may reserve from the fine particles 5 percent of the end product for coating. Such separation on the basis of particle size is desirable when the intermediate mass has sufficient liquidity to surround the coarse particles so that digestion can take place rapidly. For example its greatest usefulness is when the amount of sulphuric acid calculated at 60 degrees Baumé in ratio to the potassium chloride is greater than that of 10 to 6.

My potash-phosphorus products made as above are dry and free-flowing. They will not cake or set hard. Potash in either the chloride or sulphate forms has long presented serious difficulties in this respect now in part overcome by the addition of special and expensive steps, which my processes completely avoid. Due to my regulation of moisture through the concentrations mentioned above my mixtures are of excellent physical condition.

In a following portion of this specification I describe my use of dolomitic limestone as a carrier of magnesium. At this point it should again be stated that I may substitute ground dolomitic limestone for ground phosphate rock to the extent that magnesium instead of a phosphate is desired in a finished product. As is fully explained hereinafter this substitution is not on a pound for pound basis but in accordance with the modification of my titration test described elsewhere herein.

In the previous and other portions of this specification I present ground phosphate rock as an agency which profitably utilizes the acidic components of various intermediate materials which embody fertilizer ingredients. In every instance, however, I may substitute carbonates and to a less extent hydroxides of various metals, known as "minor elements," which for many purposes are of great importance in the growing of crops. They include magnesium, manganese, copper, zinc, iron, aluminum and many others, as is set forth at length in my said copending application Serial Number 432,350, which on March 27, 1956, matured as Patent No. 2,739,886. Since the quantity of each of these metals which is desired in the finished fertilizer is ordinarily relatively low, I often prefer to add in relatively limited quantities the ore which carries them and to rely upon ground phosphate rock to make up the balance of the material needed to make profitable use of the various acidic components above stated. On the other hand since a chief purpose of this invention is to supply bases, which are mixed with other materials, in certain instances I may rely only upon a metallic ore to make profitable use of this acidic factor.

*Magnesium potash base*

An illustration of the foregoing aspect of this invention is the employment of dolomite to furnish a water-soluble magnesium, a minor element, which now is particularly in demand since a large proportion of this material previously has been imported from abroad. Magnesium is particularly needed for sandy soils such as for example those of the potato growing areas of Maine and of citrus areas in the sub-tropical portion of the United States. Dolomitic limestone is a cheap source of this magnesium, but it renders the soil alkaline, as is not generally desired, and is not water-soluble. Magnesium in my form supplies the magnesium in water-soluble form, and does not disturb the acid-alkaline balance. The combination of magnesium and potash is particularly advantageous from the standpoints both of manufacture and use.

This phase of my invention can be well illustrated by a description of the production of a magnesium-potash base having 7 percent MgO and 25 percent $K_2O$ of the latter of which approximately one-third is in the sulphate form and two-thirds in the chloride form. Ordinary dolomitic limestone and the above described potash sludge, formed from muriate of potash by acidulation with sulphuric acid, are used as the base of this product. Dolomite, as this product is ordinarily termed, contains up to approximately 45 percent $MgCO_3$ and approximately 55 percent of $CaCO_3$, but individual lots vary widely. I mix 1750 pounds of muriate of potash and an equal amount of sulphuric acid of 60 degrees Baumé. If I heat this acid to 65 degrees C., merely by its dilution previous to application from 65 degrees Baumé, the mixing operation takes from three to five minutes. If I apply the acid at room temperature of 21 degrees C. the time of stirring must be increased by about three minutes. The NaOH factor of the resulting sludge is .26. It has a chlorine content of 16.7 percent after the evolution of approximately 250 pounds of hydrogen chloride. The manipulative steps will be discussed later. As previously stated, the ratio of resulting potassium sulphate to potassium chloride is a product both of the acid to chloride basis of the materials used and also to a less extent of the manipulation.

In cases such as this in which I use a carbonate or hydroxide in place of ground phosphate rock, I determine the amount of dolomite which must be used profitably to employ the acidic capacity of the sludge in somewhat the same manner as previously described in connection with phosphate rock. The particular dolomite which was used in the above illustration has an "acid-dolomite" factor of 1.15 which corresponds to an acid-rock factor of 2.3 for the phosphate rock employed in the previous examples. This factor, however, must be adjusted to take into account the conversion value of the potassium sulphate formed by the previous acidulation of muriate of potash by sulphuric acid. By a process of double decomposition, magnesium carbonate in the presence of acid potassium sulphate forms magnesium sulphate and normal potassium sulphate. If sufficient acidic potential is present, both the $MgCO_3$ and $CaCO_3$ are completely converted substantially immediately thereby forming a mixture of potassium, magnesium and calcium sulphate with no carbonates, but in the presence of insufficient acid for the complete conversion of both as above, the magnesium carbonate tends to decompose more rapidly than the calcium carbonate. Thus with insufficient acid for complete conversion more $MgSO_4$ is formed than $CaSO_4$. The sulphate adjustment which on the basis of my experience I make in this instance is by adding .85 to the above factor of 1.15 thereby making it 2.0. It will be remembered that in handling sulphate of ammonia sludges, I increased the acid-rock factor of 2.3 by .20 to 2.5 to make a similar adjustment for the conversion value of the sulphate therein. This adjustment must be calculated upon the basis of each set of materials used and the proportions of each. In a manner similar to that previously described, I determine that the dolomite-requirement factor of the above sludge is .52. This factor corresponds to the rock-requirement factor previously used. That is to say, I multiply the NaOH factor of the sludge, which is .26, by the adjusted acid-dolomite factor, which is 2.0, and secure .52. 2857 pounds of the above potash sludge multiplied by .52 indicates that 1485 pounds of this particular dolomite must be employed. By mixing the sludge and the dolomite there is secured a net finished product after shrinkage of approximately 4200 pounds. This product is dry and free-flowing and may be shipped and sold within a few hours after it has been mixed although the solubility of the magnesium will slowly increase.

To indicate the value which has been added to the materials by the processing alone, one may compare the manufacturers' total cost price of the materials used and of the materials secured. With sulphuric acid of fertilizer grade at $8 per ton, muriate of potash at $30 per ton and dolomite at $3.50 per ton the cost of materials to produce a ton of cured product is $17.10. Taking muriate of potash at fifty cents a unit and sulphate at sixty-five cents per unit and magnesium oxide at $1.25 per unit and hydrochloric acid at $20.00 per ton of 35 percent we have a material-value in the finished product of $25.83, indicating an increase by processing of $8.73 a figure which is unusually high in the fertilizer industry. It should be understood that the above figures in each instance are based upon the above manufacturers' net costs, and do not reflect the price at which the product would actually be sold.

It will be seen that approximately 300 pounds of the above base contain 1 percent of magnesium oxide and three and two-thirds percent of potash. Under present conditions, two percent of the magnesium oxide is the maximum amount which is ordinarily desired in a finished fertilizer. The addition of 600 pounds of the above base, which is a reasonable amount to employ as a constituent of a mixed fertilizer, to 1400 pounds of materials containing nitrogen and phosphorus would furnish two percent of MgO together with slightly more than seven percent of potash in a ton of a complete fertilizer. It should be understood, however, that I can vary the ratio between dolomite and potash substantially as may be desired by changes in the relative amount of acid used.

The manipulation of the above ingredients may be carried out upon either a batch or preferably a continuous basis.

In the former case I mix first the acid with the potassium chloride in an ordinary superphosphate pan mixer, of course removing the hydrogen chloride from the mass, and after the desired amount of HCl has been driven off add the dolomite. This entire mixing operation must be carried on for several minutes and the latter but shorter portion of the operation after the dolomite has been added requires more power than that which is usual in a superphosphate operation or in those described above. The mixture of dolomite and acidic potash sludge sets extremely quickly but not in a hard mass. Consequently while the mixing and setting operations are practically speaking simultaneous the power requirement is not excessive and beyond the capacity of the ordinary superphosphate mixer. Moreover the physical characteristics which affect the mixing operation are modified by the ratio between the dolomite and the potash. The greater the amount of potash the more granular and free-flowing the mixture and hence the more readily it can be mixed. Other variants include the temperature at which the acid is applied and the amount of acid relative to the solids which is employed to drive off the chlorine. Under normal conditions, however, the stirring operation for a relatively dry mixture requires only three or four minutes as a maximum. After the mixing of such a mass is complete it is merely put through a sizing sieve and is ready for sale and use, although solubility of the magnesium will continue to increase. If the mixture is relatively wet, stirring up to as much as about ten minutes may be required. In view of the large number of variables the only practicable way I have found of definitely defining the difference between a dry mixture, which can be sieved after a short mixing, and a wet mixture, which must be handled differently, is to define a wet mixture as one which so nearly approaches a plastic condition that it cannot be handled by a sieve or other sizing machine. No mixture made hereby, however, is sufficiently wet to be truly plastic. It will not flow. After the above mixing of a wet mixture it may be placed in a den or other convenient receptacle for a very few moments only to permit it to set. Then it is sized as previously described.

I have discovered, however, that this operation whether on a batch or continuous basis may be carried out more readily if I make use of my "two-stage" principle as previously generally described. Dolomitic limestone varies in physical condition materially as it is supplied from various mines and quarries. Some of it is extremely hard and others as for example the dolomitic sands from Florida very soft. The fineness with which the material is ground adds very much to the cost. Yet it has been considered necessary by previous practitioners that for such purposes as these dolomitic limestone be ground very finely. I have discovered, however, that I secure excellent results by a relatively coarse grinding of this rock, as for example so that forty percent will not pass through a screen of 100 meshes to the inch and sixty percent will pass through, this ratio being the 2:3 ratio elsewhere stated herein. I thereupon first mix this coarse portion and all of the acid necessary to complete the acidulation operation. It is necessary that there be sufficient liquid acid to reach all these coarse particles. After a few moments of mixing so that the acid has had opportunity to reach the entire mass and begin the digestive process I add the finer particles and continue the operation to its end.

Aside from the economy following the avoidance of fine grinding, particularly of a hard rock, I have found that even when a soft rock is used the power requirement is less if I make use of this two-stage process. Also there is less tendency for the material to ball in the mixer.

While I prefer to separate the ore on the basis of fineness of grinding I have found that as in my novel process for the manufacture of phosphoric acid, as described and claimed in my co-pending companion application, Serial Number 221,932, filed April 19, 1951, which on March 27, 1956, matured as Patent Number 2,740,116, superior results are secured in adding the rock in increments irrespective of particle size, but it should be noted that I apply to the rock first added the entire amount of acid necessary to acidulate the entire amount of ore which is used.

I much prefer, however, to manipulate the above product on a continuous basis. In that instance I may supply two mixing tanks each with a set of paddles rotatable preferably upon a horizontal axis which both mix a mass within the chamber and advance it therethrough. Into the first end of the first of these chambers, I introduce potassium chloride and sulphuric acid. Alternatively the acid may be sprayed into a chamber throughout its length in order to prevent the excessive frothing which occurs when all of the acid is introduced at once. The hydrogen chloride evolved is passed off through pipes leading from the top of this chamber and may be made into hydrochloric acid in a conventional manner. The sludge so formed thereupon passes into a second similar chamber with similar mixing and advancing paddles.

Into the first portion of this chamber I introduce a portion only of the desired quantity of dolomite thereby making use of the principles previously explained in connection with my improved method of producing triple superphosphate. That is to say, while the acidic component of the mass is relatively most active and the mass more nearly fluid and less stiff I introduce a portion only of the material to be acidulated. Thus the mass is much more moist and easy to handle with a consequent reduction of the power requirement. As the mass is advanced through this second chamber it takes the form of large particles or small pellets which are moist upon the outside. Thereupon late in the operation I add the remainder of the ground dolomite which adheres to the outside of the individual particles. In the first portion of the operation, insufficient dolomite is added to cause the mass to set into a solid hard mass and in the second stage the wet particles are coated with the remainder of the dolomite. The mass thereupon becomes relatively dry and free-flowing. The process of acidulation may continue within the pellet for several days, but at this point at which the mass is discharged from the second chamber it is dry free-flowing and in condition to be shipped.

As has been previously described herein and in my said co-pending parent application Serial Number 450,324, I find it advantageous to divide these few portions of dolomite upon the basis of coarseness of grinding. I therefore add the coarse particles to the first chamber and the fine particles to the second chamber, with the above stated advantages.

Alternatively potash sludge, produced in any manner as above described, may be passed into a chamber corresponding to that designated above as a second chamber and handled therein as immediately hereinabove described.

The division of the amount of dolomite which is to be added adjacent the entrance and exit portions of the chamber will depend entirely upon the physical condition of the mass as it enters the chamber. In the entrance portion a sufficient amount of dolomite must be added to bring the mass well beyond the plastic state and into that which can be best described as that of a damp fertilizer material. There must be sufficient moisture in the mass, however, so that it breaks up into small pellets or small agglomerations of particles to the outside of each of which the dolomite will later adhere, but there must be insufficient moisture to cause the mass to form large balls.

In the following example of the practice of this phase of this invention I may mix 2650 pounds of potassium chloride with an equal amount of sulphuric acid of 60 degrees Baumé. While this mass is in the second chamber, I add 2405 pounds of dolomite, 960 pounds in the first instance adjacent the point of entrance and the balance of 1445 pounds near the point of exit. In this instance the ratio between that added early and late is approximately as two is to three. This ratio represents an approximate extreme in one direction which in the other is represented by a one to one ratio. The base which is manufactured by the above process contains 25 percent $K_2O$ and 7 percent of MgO. When division is on the basis of fine and coarse particles, the latest portion added will include fine particles.

Particularly since a relatively small amount of water-soluble magnesium is required for many complete fertilizers, I may employ dolomite in part and ground phosphate rock in part to make effective use of the acidic factor of a potassium (or other) sludge. For example, to produce a base which contains 6.7 percent of $P_2O_5$, 20.75 percent of $K_2O$ and 3.50 percent of MgO, I may use 2000 pounds of a potash sludge such as described above having a NaOH factor of .26, a dolomite requirement of .52 and a rock requirement of .65, these requirements indicating an acid-dolomite factor of 2.0 and an acid-rock factor of 2.5. In this example I am making use of the acid potential of the sludge by the equal use of dolomite and of phosphate rock. Hence I add 520 pounds of dolomite (2000 times 5.2 divided by 2) and 650 pounds of phosphate rock (2000 times .65 divided by 2). This mixture after shrinkage yields a base of approximately 3100 pounds.

A potash sludge lends itself admirably to a making of a magnesium-potash base. I may also use the above described sulphate of ammonia sludge to produce a magnesium-nitrogen-phosphate base. The ammonium carbonate, which may be formed by the double decomposition of the ammonium sulphate and magnesium or calcium carbonate, tends to decompose into $NH_3$, $CO_2$ and $H_2O$, but this process is either retarded or stopped if monocalcium phosphate is present. Further, this decomposition is hindered by the presence of large amounts of water of crystallization, as is a novel characteristic of my product. Therefore certainly to prevent loss of nitrogen, it is necessary to have a sufficient amount of monocalcium phosphate in the mixture. The following illustration will make this exemplification of this invention clear.

An example of the foregoing process is mixing 2000 pounds of ammonium phosphate sludge having a NaOH factor of .20 and 400 pounds of dolomite and 500 pounds of phosphate rock, each having the factors indicated above, the acid-dolomite factor being adjusted on account of the presence of the sulphate as previously described. The mixing of these materials gives a finished net product of approximately 2850 pounds which analyzes 10.1 percent N, 2.95 percent MgO, and 5.75 percent $P_2O_5$. In place of the above sludge with a NaOH factor of .20, I may use the same amount of sludge with a NaOH factor of .21 and secure a base analysis of 10-6-0 with 3 percent of MgO. From the above example, it will be seen how readily different formulae may be produced by slight changes in the handling of a sludge. While the fertilizer trade desires analyses which when applied to complete fertilizers to be sold to the farmer to be expressed in even figures, bases are ordinarily sold with analyses in fractional terms.

The above principles may be applied to the making of a complete fertilizer including my potash low-chlorine base with phosphate rock acid dolomite, as I shall illustrate by describing the making of one having a formula of 6-8-10 with 2 percent of MgO.

In a pan mixer, for from three to five minutes I stir a mixture of 618 pounds of sulphuric acid of 60 degrees Baumé and 335 pounds of potassium chloride, thereby driving off 85 pounds of HCl. The result of this step is a sludge of a net weight of 868 pounds having a NaOH factor of .356. The acid-dolomite and acid-rock factors of the particular materials to be used, both as adjusted for sulphates, are respectively 1.83 and 2.50. To this sludge, I add five hundred pounds of phosphate rock and one hundred pounds of dolomite and, after rock, acid and dolomite have made thorough contact, I add 585 pounds of conventional sulphate of ammonia. The mass is poured into a den and removed therefrom after it has set, disintegrated and passed into a pelleting drum. In a late stage of the pelleting operation I add another one hundred pounds of dolomite as a coating material, which is 5 percent of the net weight (after shrinkage) of one ton.

In place of dolomite I may use any other carbonates or hydroxides which carry a metal which is desirable for inclusion in a finished fertilizer.

As a source of manganese, rhodochrosite which contains approximately 61.7 percent of manganese oxide is practicable. As a source of zinc, smithsonite, containing approximately 54.8 percent of zinc oxide, and calamine, containing approximately 67½ percent of zinc oxide, are practicable. Among the copper ores azurite, containing approximately 69 percent copper oxide and 26 percent carbon dioxide, and malachite, containing a slightly larger proportion of copper oxide and slightly less of carbon dioxide, are suitable sources. As previously stated in the use of these ores I may well apply my two-stage process, with or without division on the base of coarse and fine grinding, particularly when more than limited amounts are required.

As stated at length in my co-pending application Serial Number 432,350, which on March 27, 1956, matured as Patent Number 2,739,886, iron and aluminum, if in a form available for use by a plant, are of great value. Since the majority of phosphate rocks which are employed in the United States contain these metals, it is ordinarily not necessary to add them, but additions may be made as stated in my parent application. Also as stated therein, I may advantageously use phosphate rocks which are high in these sesqui-oxides, as cannot be done by others so far as known to me. All of these and other valuable metals when they are combined with phosphorus according to the principles and practices of my said parent application remain in truly water-soluble form as defined in said last mentioned application and by experts in the science of chemistry and hence add greatly to the value of the fertilizers of which they are constituents. For that and other reasons I much prefer that the products hereof be handled in the manner taught therein.

From the immediately foregoing portion hereof it will be understood that to the extent that these minor elements are required materials which contain them and are of a type which profitably employ the acidic components of the various above-described sludges may be used in place of phosphate rock.

Gypsum sludge

As indicated above another by-product of which I make extensive use is that created by my novel process of producing phosphoric acid. In my co-pending companion application Serial Number 221,932, filed April 19, 1951, which on March 27, 1956, matured as Patent Number 2,740,116, a division of my said co-pending parent application Serial Number 450,324, I describe and claim novel methods of producing phosphoric acid by which I produce a gypsum sludge bearing a substantial residue of phosphoric acid. By not carrying the washing of this product to a conclusion I produce phosphoric acid at a greatly reduced cost and have available this valuable by-product. The amount of phosphoric acid remaining in this sludge produced by me is dictated by a practical and economic considerations. Under ordinary conventional processes of producing phosphoric acid the acid remaining in the sludge runs between 2 and 4 percent of the total of the sludge but I prefer deliberately to permit it to run much higher, the extent of the excess again depending upon practical and economic considerations. Alternatively I may utilize such a conventional low-phosphorus sludge.

In accordance with the principles of this invention I combine this acid-bearing gypsum sludge just as it comes from the phosphoric acid process without any further processing either with other sludges or with other fertilizer materials. This is another illustration of my primary principle of consolidating operations in order to produce more efficiently and cheaply.

My gypsum sludge is well adapted as a base of a complete fertilizer which is highly valuable particularly under certain specialized conditions. Although I much prefer to produce concentrated fertilizers in order to save costs of freight, handling and application there are many conditions under which fertilizers of a lower grade fill a real need. In such instances I may introduce this gypsum phosphorus-bearing sludge while still moist and other fertilizer ingredients into a mixing pan, mix, permit it to stand for a few minutes in any convenient receptacle, disintegrate, and pass it through a pelleting drum as previously described. When I use a relatively dry sludge, I pass it directly from the mixer to the pelleting drum. All of the available phosphorus contained in the gypsum is of course utilized and the gypsum is a highly desirable pelleting agent.

My gypsum sludge is particularly valuable as a pelleting agent introduced with other materials early in a pelleting operation. It acts as a binder and source of moisture, and is especially useful when phosphate rock or dolomite is used only in a late stage of the pelleting operation and as a coating material. As illustrated in the following example it acts as a binder of finished fertilizer materials.

The use of gypsum sludge makes it possible for me to secure a dry and pelleted product by the use of certain fertilizer ingredients which otherwise particularly in certain proportions could not be handled readily. An illustration of such a product is one of an analysis of 10–2–14 made from 975 pounds of ordinary commercial sulphate of ammonia, 500 pounds of ordinary potassium chloride, 550 pounds of gypsum sludge of 3.2 percent $P_2O_5$ having a NaOH factor of .025 as defined above and 75 pounds of ground phosphate rock, this amount of coating material being slightly less than my usual five percent because of the slightly lowered moisture and free acid content of the mass. The ingredients other than the phosphate rock are mixed in an ordinary mixing pan and passed to a pelleting drum. In a late stage of the pelleting operation, the phosphate rock is added. The result is a dry, free-flowing, nearly homogeneous pellet composed largely of nitrogen and potash but having enough phosphorus for many special purposes as for example a top dressing for citrus groves, cotton and pastures. Conventional mixtures of sulphate of ammonia and muriate of potash are of such physical condition that they cannot be handled without the addition of large quantities of organic conditions. Such conditioners are very expensive per pound of plant food and their use results in a product in which the individual components segregate, thus making uniform application of the soil difficult.

The above formula well illustrates one in which I use a minimum amount of the gypsum sludge primarily for the physical quantities which it imparts to the product. Additional amounts may be advantageously used, particularly when fertilizers of a lower concentration are desired or when gypsum is wanted for the calcium and sulphur which it contains.

The following example of a fertilizer of a 6–5–6 analysis illustrates both points of particular value stated above.

A phosphorus-bearing gypsum sludge which is a by-product of the production of phosphoric acid may well serve as the basis of a relatively low grade low phosphatic fertilizer which is particularly adapted for certain soils, such for example as those of Florida, for which additional gypsum is highly desirable but little phosphorus is needed. To secure such a complete fertilizer of an analysis of 6–5–6 I may mix 900 pounds of gypsum sludge having 3.2 percent of $P_2O_5$ and a NaOH factor as previously defined of .02, 200 pounds of muriate of potash, 675 pounds of sulphate of ammonia sludge containing 17.8 percent of nitrogen and having a NaOH factor of .08, and 125 pounds of ground phosphate rock of 72 percent bone phosphate of lime. After a preliminary mixing I pass these materials through a rotating pelleting drum and late in this operation add an additional amount of one hundred pounds of such phosphate rock, thereby using a total of 225 pounds of the rock.

It will of course be understood that I may combine the above gypsum sludge with any other suitable fertilizer ingredients since I am not limited to the use of ammonium sulphate sludge, although of course it is necessary to employ ground phosphate rock in accordance with the fundamental teachings of this invention.

From the foregoing portion of this specification relating to sulphate of ammonia, it will have been noted that according to this invention I add phosphate rock to a mass already containing plant food in the presence of free acid or an acidic salt which according to conventional practice otherwise would have to be eliminated by a costly process or neutralized and hence rendered unproductive. I am therefore able quickly and cheaply to convert what otherwise would be an intermediate product into an end product either for direct sale or one which without further processing can be used as a base, in fertilizer terms, for mixing with other plant food to furnish a complete fertilizer.

Complete fertilizers from sludges

In the above portion of this specification I have illustrated the making of complete fertilizers in which one or two of the three major elements have been provided by the use of sludges containing both fertilizer materials of great value and an acidic potential. I shall now illustrate the application of this invention to the making of complete mixed fertilizers in which all of the major ingredients are secured from such sludges, or an intermediate base made from one thereof, and phosphate rock or dolomite.

In my said co-pending parent application I stated that I may combine my several bases in accordance with the teachings thereof to produce fertilizers known in the trade as complete, together with the admixture of magnesium. In said application I describe a base made from a potash sludge which in a quantity of 2000 pounds when acidulated with 520 pounds of dolomite and 620 pounds of phosphate rock gives a net product of 3500 pounds which analyzes 0–6.7–20.75, with 3.5 MgO. I also describe a base made with an ammonium sludge which when combined with 400 pounds of dolomite and 500 pounds of ground phosphate rock gives a net product of 2850 pounds with an analysis 10–5.75–0, with 2.95 of MgO. When I mix 2000 pounds of this potash sludge, 2000 pounds of this ammonium sludge with the same corresponding quantity of dolomite and phosphate rock, namely 920 pounds and 1150 pounds, I secure a net product of 5950 pounds (after deducting a shrinkage of 120 pounds) which analyzes 4.8–6.4–10.8 with 3.2 of MgO. The chlorine constituent of the above product is 13.6.

As stated in my said co-pending parent application I find the addition of a gypsum sludge particularly useful as a pelleting agent. Use of 2000 pounds each of the above potash and ammonium sludges together with 550 pounds of my gypsum sludge and with the addition of 920 pounds of dolomite and 1225 pounds of phosphate rock, as above stated, gives a net product of 6576 pounds (after 120 pounds of shrinkage). The acid-rock factor of the gypsum sludge, having a content of 3.2 $P_2O_5$ and an acid-rock factor of .025, requires the addition of 75 pounds of phosphate rock. This product has an analysis of 4.3–6.5–9.9, with 2.9 of MgO and 12 percent chlorine.

As previously stated I prefer to pellet these products. To do so, while they are still chemically active I pass them through a pelleting drum, first having reserved about 5 percent on the basis of the weight of the end product of either phosphate rock or dolomite, or a combination thereof. In a late stage in the pelleting operation I add this reserved portion as a coating.

An excellent example of my use of these bases to form complete mixed fertilizers is given by the combination of 2000 pounds of my said potash base 0–14–15, and 2000 pounds of my said ammonia sludge, 400 pounds of dolomite and 500 pounds of phosphate rock. This mixture after allowing for shrinkage gives a net product of 4850 pounds of an exact analysis of 5.77–9.4–6.2, with 1.7 of MgO and 1 percent of chlorine. Under usual fertilizer practice such as a base would be standardized as a 6–9–6.

Among the most widely used formulae in the United States is that represented by 5–7–5. I may secure the nitrogen component for such a complete fertilizer from 650 pounds of my novel acidic base made from sulphate of ammonia intermediate base and having 15.89 percent nitrogen and 2.30 percent phosphorus and a NaOH factor as stated above of .0836. This is the material to which only sufficient phosphate rock has been added to make it possible for an operator of a by-product coke plant readily to ship the material. The potash component may be secured from 273 pounds of potash sludge containing 37 percent $K_2O$ and 20 percent chlorine and having a NaOH factor as above of .19456. The phosphorus component may come from a total of 302 pounds of ground phosphate rock and 775 pounds of gypsum sludge having 3.2 percent of $P_2O_5$ and a NaOH factor as above of .025.

I divide the phosphate rock into two parts, one of 202 pounds and one of 100 pounds. I mix the rock and the other ingredients and then immediately pass the mass so formed into a pelleting drum which is continuously revolved. During the latter portion of the pelleting operation I add the remaining 100 pounds of phosphate rock as a coating material. Of the 302 pounds of phosphate rock, 137 pounds is chemically allocated to the sulphate of ammonia acidic base, 46 pounds to the gypsum sludge and 119 pounds to the potash sludge. That is to say, the foregoing amounts of ground phosphate rock are required in order to complete the reactions with the acidic intermediate sulphate of ammonia base and the two sludges. Since the total product is one ton it will be noted that the amount of ground phosphate rock added as the last step is five percent of the total.

Another formula which is very widely used throughout the United States is represented by 8–8–10. To make such a complete fertilizer, I may employ 937 pounds of the sulphate of ammonia sludge, 545 pounds of potash sludge and 518 pounds of ground phosphate rock. In this case the entire phosphate content comes from the phosphate rock. After the mixing of the above ingredients they are put through a pelleting drum as previously described but the resulting product is granular rather than pelleted. That is to say the individual components are small grains. If a pelleted fertilizer is desired, 40 pounds of water should be added, this dilution resulting in an analysis slightly under that stated above.

Hereinabove I have illustrated this invention by use of an acidic sludge containing sulphate of ammonia made as a by-product of the destructive distillation of coal. Another illustration shows my use of an acidic potash-containing sludge which is produced in connection with the evolution of chlorine from potassium chloride. It is within the scope of this invention, however, purposely to form other than as a by-product acidic sludges which have similar characteristics. Under many conditions I may advantageously mix sulphuric acid with ordinary commercial sulphate of ammonia or potassium sulphate and handle the resulting mixtures as hereinabove described. Alternatively commercial gypsum or a gypsum sludge without an acidic potential under some circumstances particularly when a low grade fertilizer is wanted may be used with an acidic sludge in any reasonable proportion to form a binder for the pellets. Also as a basis for the production of a low grade fertilizer base and hydrochloric acid I may overacidulate any cheap metallic chloride such as calcium or sodium chloride, and utilize the acid potential of the sludge to acidulate phosphate rock.

In these various sludges, whether deliberately formed or produced in connection with another operation, there may exist concurrently in acidic salt, a normal salt and free acid or any two thereof depending upon the characteristics of that particular mass particularly in reference to the acid. In the finished products hereof, however, all such acidic potentials have been utilized. Where in the specification and claims hereof in connection with an intermediate product I refer to a salt without designating whether it is normal or acidic, I include both or either. In such cases since there is an acidic potential present it is not important whether it comes from an acidic salt or a free acid.

It will of course be understood that the particular formulae which I am presenting herein are for purposes of illustration only and that other combinations of materials within the scope of the processes herein set out and claimed may be employed. Also I may use the principles of one phase of this invention in carrying out another.

In the claims and the specification hereof I frequently use the term "all" or one of similar significance as applied to a particular material or result. It is to be understood that this invention relates not to laboratory operatings but to commercial undertakings in a heavy chemical industry. Consequently I am dealing with relatively crude and impure substances and therefore an adverb such as "substantially" should be understood as applying to any absolute statement. Thus by a phrase such as "acidulate all of (a batch of) phosphate rock" I mean that I carry the conversion of the unavailable phosphate to an available form to a point which is economically desirable in a manufacturing operation as determined by economic and practical considerations, as will be understood by those skilled in this art, and not to completion as in a laboratory exercise. Similarly when I speak of "complete hydration" I mean hydration to a point when the product is palpably dry, as for example, a superphosphatic fertilizer containing 5 or 6 percent moisture.

In the above connection it should also be understood that in the typical end product hereof I prefer to use a surplus of ground phosphate rock so that generally in a finished product literally "all" of the acidic potential including free acid of the several products has been utilized. A slight surplus of phosphate rock is not in any way harmful in my products because it does not cause a reversion of an available phosphate to an unavailable form. As is explained at length in my said co-pending application Serial Number 432,350, which on March 27, 1956, matured as Patent Number 2,739,886, products made in accordance with the full teachings thereof include an acidic phosphatic salt. The fact that I am able to produce an acidic phosphatic salt which is persistent in the soil is one major reason for the crop-producing capacity of my products.

A most important factor in the carrying out of all forms of the invention hereof is that the moisture is removed not by expensive physical processes but by the chemical action of free moisture passing into water of crystallization thereby contributing in no small measure to the acidic character of the phosphatic salt which I produce and also hardening and drying the mass. It should be emphasized that I do not employ kiln or other drying, but the product is dry within an hour or two after mixing. Further, the resulting end product is free-flowing and not objectionably hydroscopic but it is not dusty.

The products of all phases of this invention are in the form of a mass of coarse grains or pellets. In my mixtures, which include a substantial amount of phosphate rock, say of about 20 percent or more of the weight of the mass to be pelleted, by following the teachings of my said co-pending application Serial Number 432,350, which on March 27, 1956, matured as Patent No. 2,739,886. I may produce a pellet of any desired size which can be drilled. Furthermore my use of gypsum sludge also enables me to control the size of the pellet, with or without phosphate rock. Also, as indicated hereinbefore, the pelleting operations must be carried out quickly before the mixtures have opportunity to set too hard.

From the above portion of this specification it will have been noted that I employ ground phosphate rock or a metallic ore as a medium completely to utilize acidic components, whether in the form of free acid or an acid salt or salts or both, which otherwise would necessarily be removed from the mass by an expensive process or neutralized in such fashion as to lose the acidic potentiality and add a dead weight of material. It should be particularly emphasized that in all instances I handle the product after mixing under such conditions as permit rapid dissipation of the heat and prevent dehydration. This I not only avoid be reversion of available fertilizer materials to unavailable forms, but I also conserve the advantage stated in my said application Serial Number 432,350, which on March 27, 1956, matured as Patent Number 2,739,886. For a time in the development of the fertilizer industry, ground phosphate rock was added to superphosphate in order to neutralize free acid and then the mass placed in large piles. The additional heat of this reaction caused reversion and the practice was long ago given up, so far as I am aware. In almost all of the examples of my invention which are stated above it will be noted that I add ground phosphate rock under such conditions that appreciable heat is not caused, as for example in those cases in which the proportion of phosphate rock to the total mass is relatively small, and also that after the mixing operation what heat there is decreases steadily.

The advantages of this invention include the provision of novel methods whereby full and effective use is made of acidic components which otherwise would be either lost or rendered effective only at high cost. The advantages hereof include making full and novel use of by-products which otherwise would be lost or recovered at higher cost and of economically and efficiently producing by-products of great value particularly at the present time. Other advantages include the novel products which are made in accordance with such methods. Other advantages, characteristics and objects of this invention will be evident from the foregoing portion of this specification and the sub-joined claims.

I claim:

1. A process of manufacturing a mixed phosphatic fertilizer which also contains nitrogen, potash and magnesium and is low in chlorine which comprises passing gas from the destructive distillation of coal through a bath of sulphuric acid, the ratio of said sulphuric acid to the ammonia of the gas being such as to produce a first acidic sludge, mixing potassium chloride and sulphuric acid in proportions to evolve hydrogen chloride and to form a second acidic sludge, the amount of sulphuric acid being substantially greater than that which is necessary to produce the amount of hydrogen chloride which is evolved, mixing said first and second acidic sludges ground phosphate rock and ground dolomite in proportions to convert the insoluble magnesium of the limestone to a soluble form and the unavailable phosphate of the rock to available forms, the concentration of said acid being such as to supply not more than the amount of water required in the acidulation reaction and the amount necessary to furnish substantially the full amount of water of crystallization for the completely hydrated product and the above operations being carried out in the absence of external heat, and curing said mixture.

2. A process of manufacturing a mixed phosphatic pelleted fertilizer which also contains nitrogen potash and magnesium and is low in chlorine which comprises passing gas from the destructive distillation of coal through a bath of sulphuric acid, the ratio of said sulphuric acid to the ammonia of the gas being such as to produce a first acidic sludge, mixing potassium chloride and sulfuric acid in proportions to evolve hydrogen chloride and to form a second acidic sludge, the amount of sulphuric acid being greater than that which is necessary to produce the amount of hydrogen chloride which is evolved, mixing said first and second acidic sludges ground phosphate rock and ground dolomite in proportions to convert the insoluble magnesium of the limestone to a soluble form and the unavailable phosphate of the rock to available forms, and pelleting said mixture while still chemically active, the concentration of said acid being such as to supply not more than the amount of water required in the acidulation reaction and the amount necessary to furnish substantially the full amount of water of crystallization for the completely hydrated product and the above operations being carried out in the absence of external heat, maintaining as free moisture and water of crystallization substantially all of the moisture present at the time of pelleting.

3. A process of manufacturing a mixed fertilizer which contains available nitrogen and potash which is low in chloride content, which also contains nutrients derived from a material selected from the group consisting of dolomitic limestone and phosphate rock, forming a first acidic sludge by the ammoniation of sulfuric acid of a concentration of at least 52° Baumé, said first acidic sludge having a substantial proportion by weight of solid ammonium sulphate; mixing and agitating potassium chloride and concentrated sulphuric acid in substantial excess of the amount required to convert all of said potassium chloride to normal potassium sulphate, to liberate hydrogen chloride and form a second acidic sludge; removing the evolved hydrogen chloride from said second acidic sludge; mixing said first and second acidic sludges with a ground material selected from said group consisting of phosphate rock and dolomitic limestone in such proportions as to convert the unavailable nutrients of the ground material to an available form, the concentration of the acid in said mixed sludges being such as to supply not more than the amount of water required in the acidulation reaction and the amount necessary to furnish substantially the full amount of water of crystallization for the completely hydrated product; the above operations being carried out in the absence of external heat; and subjecting the intermixed sludges and ground rock to movement thus forming a coalesced, substantially dry, particulate fertilizer of a desired size.

4. A process of manufacturing a mixed phosphatic fertilizer which also contains nitrogen and potash and magnesium and is relatively high in calcium and sulphur and low in chlorine which comprises: passing gas from the destructive distillation of coal through a bath of sulphuric acid, the ratio of said sulphuric acid to the ammonia of the gas being such as to produce a first acidic sludge; mixing potassium chloride and sulphuric acid of a concentration of 60 degrees Baumé or greater in proportions to evolve hydrogen chloride and to form a second acidic sludge, the proportion of sulphuric acid being of the order of more than 2 mols of sulphuric acid to each mol of hydrogen chloride, the hydrogen chlorine evolved being removed from the mass; mixing sulphuric acid and phosphate rock in proportion and concentration to form phosphoric acid of the order of 30 degrees Baumé and a third gypsum sludge, said phosphoric acid being separated from said gypsum sludge; mixing all three of said acidic sludges and ground phosphate rock and ground dolomite in proportions to convert the insoluble magnesium of the limestone to the soluble form and the unavailable phosphate of the rock to available forms; the moisture content of the sludges being such as to supply not more than the amount of water required in the acidulation reaction and the amount necessary to furnish substantially the full amount of water of crystallization for the completely hydrated product and all of the above operations being carried out in the absence of external heat; and curing said mixture.

5. A process of manufacturing a mixed phosphatic fertilizer which also contains nitrogen and potash and magnesium and is relatively high in calcium and sulphur and low in chlorine which comprises: passing gas from the destructive distillation of coal through a bath of sulphuric acid, the ratio of said sulphuric acid to the ammonia of the gas being such as to produce a first acidic sludge; mixing potassium chloride and sulphuric acid of a concentration of 60 degrees Baumé or greater in proportions to evolve hydrogen chloride and to form a second acidic sludge, the proportion of sulphuric acid being of the order of more than 2 mols of sulphuric acid to each mol of hydrogen chloride, the hydrogen chlorine evolved being removed from the mass; mixing sulphuric acid and phosphate rock in proportion and concentration to form phosphoric acid of the order of 30 degrees Baumé and a third or gypsum sludge, said phosphoric acid being separated from said gypsum sludge; mixing all three of said acidic sludges and ground phosphate rock in proportion to convert the unavailable phosphate of the rock to available forms; the moisture content of the sludges being such as to supply not more than the amount of water required in the acidulation reaction and the amount necessary to furnish substantially the full amount of water of crystallization for the completely hydrated product and all of the above operations being carried out in the absence of external heat; and curing said mixture.

6. A process of manufacturing a mixed phosphatic fertilizer which also contains nitrogen and potash and magnesium and is relatively high in calcium and sulphur and low in chlorine which comprises mixing a first acidic sludge composed of solid ammonium sulfate particles of the order of approximately 75 percent of the total and free sulphuric acid of a concentration of 52 degrees Baumé or greater, a second acidic sludge including $KHSO_4$, $KCl$ and free $H_2SO_4$ of a concentration of 52 degrees Baumé or greater, a third or phosphorus-bearing acidic gypsum sludge, and ground phosphate rock and ground dolomite in proportions to convert the insoluble magnesium of the limestone to soluble forms and the unavailable phosphate of the rock to available forms, the moisture content of the sludges being such as to supply not more than the amount of water required in the acidulation reaction and the amount necessary to furnish substantially the full amount of water of crystallization for the completely hydrated product, the above operations being carried out in the absence of external heat, and curing the mixture.

7. A process of manufacturing a mixed phosphatic fertilizer which also contains nitrogen potash and magnesium and is relatively high in calcium and sulphur and low in chlorine which comprises mixing a sludge composed of solid ammonium sulfate particles of the order of approximately 75 percent of the total and free sulphuric acid of a concentration of 52 degrees Baumé or greater, a second acide sludge including $KHSO_4$, $KCl$ and free $H_2SO_4$ of a concentration of 52 degrees Baumé or greater, a third or phosphorus-bearing acidic gypsum sludge, and ground phosphate rock in proportions to convert the unavailable phosphate of the rock to available forms, the moisture content of the sludges being such as to supply not more than the amount of water required in the acidulation reaction and the amount necessary to furnish substantially the full amount of water of crystallization for the completely hydrated product and the above operations being carried out in the absence of external heat, and curing said mixture.

8. A process of manufacturing an ammonium phosphatic fertilizer which comprises forming an acidic sludge containing a substantial proportion of solid ammonium sulphate and free sulphuric acid, the concentration of the acid being such that no more water is present than that required in the acidulation reaction with phosphate rock to produce superphosphate and to furnish substantially all of the water evaporated by the natural heat of reaction and all of the water of crystallization required by complete hydration of the product, mixing said sludge with a first amount of finely divided phosphate rock in such quantity that the mixture can be pelleted and processed in a rotating drum, immediately pelleting said mixture in said drum and adding to said embryo pellets a second quantity of phosphate rock in such amount that the pellets are coated, remaining free acid combined as superphosphate, and the pellets converted to a dry, non-coalescent condition, said operations being conducted under conditions such that the heat of reaction is dissipated readily and substantially no evaporation of water occurs.

9. A process of manufacturing an ammonium phosphatic fertilizer which comprises forming an acidic sludge containing a substantial proportion of solid ammonium sulphate and free sulphuric acid, the concentration of the acid being such that no more water is present than that required in the acidulation reaction with phosphate rock to produce superphosphate and to furnish substantially all of the water evaporated by the natural heat of reaction and all of the water of crystallization required by complete hydration of the product, mixing said sludge with a first amount of finely divided phosphate rock in such quantity that the mixture can be pelleted by being tumbled upon itself, immediately so pelleting said mixture and adding to said embryo pellets a second quantity of phosphate rock in such amount that the pellets are coated, remaining free acid combined as superphosphate, and the pellets converted to a dry, non-coalescent condition, said operations being conducted under conditions such that the heat of reaction is dissipated readily and substantially no evaporation of water occurs.

10. A process of manufacturing a particulate ammonium phosphatic fertilizer which comprises agitating and mixing, in at least two steps, an acidic sludge containing substantial proportions of ammonium sulphate and free sulphuric acid with a predetermined amount of ground phosphate rock, the concentration of the acid being such that no more water is present than that required in the acidulation reaction of said sludge with said predetermined amount of phosphate rock to produce superphosphate and to furnish substantially all of the water evaporated by the natural heat of reaction and all of the water of crystallization required by complete hydration of the product, one step comprising mixing said sludge during said agitation with a first amount of finely divided phosphate rock in such quantity that the mixture can be pelleted, pelleting said mixture by tumbling said mixture upon itself, and in a later step adding to said pellets while they are still moist a second quantity of phosphate rock in such amount that the pellets are coated, remaining free acid combined as superphosphate, and the pellets converted to a dry, noncoalescent condition, said pelleting and coating operations being conducted under conditions such that the heat of reaction is dissipated readily and substantially no evaporation of water occurs.

11. The process of manufacturing a particulate fertilizer having a nitrogen content of at least 6% by weight which comprises: forming a moist plastic acidic sludge from which substantially no liquids run, by passing an ammonia-containing gas through sulphuric acid of a concentration of at least 52° Baumé, continuing the absorption of the ammonia to a point past the point of saturation until about 75% of the sludge so formed is solid ammonium sulphate, the remainder of the sludge being free sulphuric acid and ammonium acid sulphate, the acidic potential of the sludge so formed being the equivalent of sulphuric acid of at least about 52° Baumé; agitating and mixing said sludge with a predetermined amount of ground phosphate rock, said rock being in such proportion that the unavailable nutrients of said rock are converted to available forms and the acidic components of the sludge are reacted, the amount of water present bieng only that required by complete reaction of the sludge and ground rock and to furnish water of crystallization of the fertilizer product after loss of water evaporated by the natural heat of reaction, and during such reaction, carrying out said agitating and mixing in two steps, in the first step adding a first portion of said ground rock and agitating and mixing to form agglomerations, with acid-wetted surfaces, by the coalescence of smaller particles, and thereupon adding a second portion of said rock and agitating said agglomerations therewith to coat and dry the said surfaces by said second addition of rock, thereby obtaining said particulate fertilizer.

12. A process of manufacturing a pelleted ammonium phosphate fertilizer as a by-product operation in the purification of the producer gas formed by the destructive distillation of coal wherein said gas containing ammonia as an impurity is passed into a bath of sulphuric acid; passing said impure gas through a given amount of sulphuric acid of a concentration of 52 degrees Baumé or greater past the point of saturation until said sulphuric acid has absorbed a predetermined amount of ammonia thereby forming a moist sludge containing solid ammonium sulfate in free sulphuric acid in accordance with said predetermined proportions, and mixing said sludge so formed with a first amount of ground phosphate rock in such quantity that the mixture can be pelleted by being tumbled upon itself, immediately so pelleting said mixture and adding to the embryo pellets a second quantity of ground phosphate rock in such amount that the pellets are coated remaining free acid combined as superphosphate and the pellets converted to a dry noncoalescent condition, such pelleting operation being conducted under conditions such that the heat of reaction is dissipated readily and substantially no evaporation of water occurs.

13. A process of manufacturing a pelleted fertilizer containing potash and phosphate which comprises mixing potassium chloride and sulphuric acid, the amount of said sulphuric acid being in substantial excess of the amount necessary to convert the potassium chloride to normal sulphate thereby evolving chlorine and forming an acidic liquid-containing plastic mass, mixing with said mass a quantity of ground phosphate rock less than that necessary to utilize the acidic component thereof to convert the total of the unavailable phosphates of said rock to available forms, substantially immediately thereafter and while the mixture thus formed is chemically active pelleting the mixture thus formed, and in a late stage of this pelleting operation adding a quantity of ground phosphate rock in such amount that the pellets are coated and remaining free acid combined as superphoshate and the pellets rendered dry and non-coalescent thereby maintaining their integrity during subsequent storage, handling and use.

14. A process of manufacturing a pelleted fertilizer containing potash and phosphate which comprises mixing potassium chloride and sulphuric acid, the amount of said sulphuric acid being in substantial excess of the amount necessary to convert the potassium chloride to acid sulphate thereby evolving chlorine and forming an acidic liquid-containing plastic mass, removing said chlorine from the mass, mixing with said mass a quantity of ground phosphate rock less than that necessary to utilize the acidic component thereof to convert the total of the unavailable phosphate of said rock to available forms, substantially immediately thereafter and while the mixture thus formed is chemically active pelleting the mixture thus formed, and in a late stage of this pelleting operation adding a quantity of ground phosphate rock in such amount that the pellets are coated and remaining free acid combined as superphosphate and the pellets rendered dry and non-coalescent thereby maintaining their integrity during subsequent storage, handling and use.

15. A process of manufacturing a particulate fertilizer low in chloride content from potassium chloride, sulphuric acid, and a finely divided material selected from the group consisting of phosphate rock and dolomitic limestone, which comprises: adding to a predetermined amount of potassium chloride a predetermined amount of flowable sulphuric acid of a concentration of about 60° Baumé or greater, the temperature of said acid at the time of addition being such that the acid will flow to reach the partciles of the mass of potassium chloride to secure rapid chemical action, said predetermined amounts and said predetermined concentration being sufficient in themselves and without the application of external heat to evolve a predetermined amount of hydrogen chloride equal to from about 50% to about 96% of the chlorine originally present in the potassium chloride, the ratio of sulphuric acid to potassium chloride employed being substantially more than one moleclule of sulphuric acid to each molecule of potassium chloride, in the absence of external heat mixing such amounts of said sulphuric acid and potassium chloride; likewise in the absence of external heat removing the hydrogen chloride so evolved from the mass, thereby creating an over-acidulated sludge containing potassium sulphate and free sulphuric acid and from which substantially no liquid will flow, said steps of mixing the sulphuric acid and potassium chloride and removing the hydrogen chloride being performed in a matter of minutes; immediately thereafter agitating said over-acidulated sludge, together with a first portion of a predetermined amount of said selected finely divided material from the group consisting of phosphate rock and dolomitic limestone, to break up said sludge and to mix it and said first portion of said finely divided material and to form the mixture into agglomerations with acid-wetted surfaces; continuing said agitation while adding the remainder of said predetermined amount of said material, said continuing agitation with the addition of said second portion of said material drying said surfaces and forming discrete granules or pellets of a size to be useful in conventional agricultural drilling machinery; said total predetermined amount of finely divided material being sufficient to utilize substantially all of the acidic components of said sludge to convert unavailable nutrients of said selected material to available form and to form an integral part of and be chemically bonded to said agglomerations thereby drying the agglomerations and rendering them permanently discrete, there being no more water present than that amount required to furnish the water of crystallization of the fertilizer product produced, said process in its entirety being carried out without the addition of external heat, and without heat other than that exothermic heat inherent to the admixture of sulphuric acid at any flowable temperature and potassium chloride and phosphate rock.

16. The process of claim 15 in which the finely divided material is phosphate rock.

17. The process of claim 15 in which the finely divided material is dolomitic limestone.

18. A process of manufacturing a pelleted fertilizer containing potash and phosphate which comprises mixing potassium chloride and sulphuric acid, the concentration of the acid being of about 60° Baumé or greater, the amount of said sulphuric acid being in substantial excess of the amount necessary to convert a predetermined amount of the potassium chloride to acid sulphate thereby liberating hydrogen chloride and forming an acidic liquid-containing plastic mass, agitating the mass to remove said hydrogen chloride therefrom, mixing with said mass a quantity of ground phosphate rock less than that necessary to utilize the acidic component thereof to convert the total of the unavailable phosphate of said rock to available forms, promptly thereafter and while the mixture thus formed is still moist and chemically active agitating the mixture to form agglomerated particles or pellets, and in a late stage of this agglomerating or pelleting operation adding a quantity of ground phosphate rock in such amount that the pellets are coated and remaining free acid combined as superphosphate and the pellets rendered dry and noncoalescent, thereby maintaining their integrity during subsequent storage, handling and use.

19. A process of manufacturing a fertilizer containing potash and magnesium which comprises mixing potassium chloride and sulphuric acid, the amount of said sulphuric acid being in substantial excess of the amount necessary to convert the potassium chloride to acid sulphate thereby evolving chlorine and forming an acidic liquid-containing plastic mass, removing said chlorine from the mass, mixing with said mass a quantity of ground dolomitic limestone less than that necessary to utilize the acidic component thereof to convert the total of the magnesium of said limestone to a water-soluble form, substantially immediately thereafter and while the mixture thus formed is chemically active turning the mixture over upon itself to cause the particles thereof to unite into larger agglomerations or pellets, and in a late stage of this operation adding a further quantity of ground limestone in such amount that the pellets are coated.

20. A process for producing a particulate fertilizer which contains potash and magnesium and is low in chloride content which comprises mixing sulphuric acid of a predetermined amount and concentration and potassium chloride, with substantial agitation and in a ratio to evolve hydrogen chloride and to produce $K_2SO_4$, $KHSO_4$, and $H_2SO_4$ in the form of an acidic sludge; dividing a predetermined amount of finely divided dolomitic limestone into two substantial portions, said predetermined amount of limestone being sufficient to neutralize all of the acidic components of said sludge; while the sludge is relatively moist adding a first of said portions of said ground dolomitic limestone to said acidic sludge and agitating said mixture, said first portion being insufficient to cause the mixture to set into a solid hard body but sufficient under agitation to produce over-acidulated moist coalesced particles from smaller particles, producing said larger particles by said agitation; thereafter adding said second portion of said ground dolomitic limestone, said second portion being sufficient only to adhere to the outside of said larger coalesced particles and to coat them by being bonded thereto by the reaction of the acidic components; and continuing the agitation until said coating and bonding operation is completed; whereby the unavailable nutrients of said dolomitic limestone are converted to available form and a dry particulate fertilizer useful in conventional agricultural drilling machinery is obtained.

21. The process for producing a particulate fertilizer which contains potash and magnesium and is low in chloride content which comprises: mixing predetermined amounts of sulphuric acid and potassium chloride, said predetermined amounts and the concentration of said acid being such and being used in a ratio to evolve hydrogen chloride and to produce $K_2SO_4$, $KHSO_4$, and $H_2SO_4$ in the form of an acidic sludge which will not flow; dividing a quantity of ground dolomitic limestone which is relatively coarsely ground into two substantial portions, one containing coarse particles and the other containing fine particles, said predetermined quantity of dolomitic limestone being sufficient when added to said non-flowing sludge to neutralize all of the acidic components of said sludge and to have the unavailable nutrients thereof converted to available form; while said sludge is relatively moist agitating the same and during said agitation adding said coarse particles of dolomitic limestone thereto to produce over-acidulated coalesced larger particles; thereafter while said coalesced particles are still chemically active, adding the fine particles of dolomitic limestone and continuing the agitation until the coalesced particles are coated therewith, said amount of fine particles being sufficient to utilize substantially all of the remaining acid potential of said sludge.

22. A process of producing a fertilizer which contains potash and magnesium and is low in chloride which comprises: mixing in a first chamber sulphuric acid of a concentration of 60° Baumé or greater, and potassium chloride, the ratio of said acid, calculated at said concentration, to the potassium chloride being substantially in excess of 10 parts to 6 by weight, said sulphuric acid being sufficient in ratio to said potassium chloride and in concentration to evolve a desired quantity of hydrogen chloride from said potassium chloride in the absence of external heat; conducting said mixing operations in the absence of external heat and evolving the desired amount of hydrogen chloride; removing said hydrogen chloride from said mixture likewise in the absence of external heat by means of said agitation; passing the acidic sludge so formed into a second chamber; dividing a predetermined quantity of ground dolomitic limestone into two substantial portions, said predetermined quantity of limestone being sufficient to utilize the acidic component of the entire quantity of such sludge, the first of said portions of said limestone being insufficient to harden the sludge to a degree so that it cannot be readily worked and being sufficient upon agitation to produce larger discrete particles by the union of smaller particles, and said second portion of limestone being sufficient to adhere to the outside of said individual larger particles by being chemically bonded thereto under agitation by the reaction therewith of the remaining acidic components; mixing and agitating the sludge and said major portion of said limestone and producing said larger discrete particles; introducing said second portion of said limestone into said second chamber; and continuing the mixing and agitating operation, thus adhering said second portion of the limestone to the outside of said discrete larger particles.

23. A process of manufacturing a pelleted superphosphatic fertilizer which comprises mixing a phosphate-bearing gypsum sludge which is a by-product of the manufacture of phosphoric acid and an acidic sludge containing another fertilizer ingredient and an amount of ground phosphate rock not quite sufficient to utilize the acidic potential of said sludges, pelleting said mixture, and in a late stage of the pelleting operation adding a coating of ground phosphate rock of an amount sufficient to utilize the remaining acid component of said sludges.

24. A process of manufacturing a pelleted superphosphatic fertilizer which comprises mixing a phosphate-bearing gypsum sludge and an acidic sludge containing another fertilizer ingredient and an amount of ground phosphate rock not quite sufficient to utilize the acidic potential of said sludges, pelleting said mixture, and in a late stage of the pelleting operation adding a coating of ground phosphate rock of an amount sufficient to utilize the remaining acid component of said sludges.

25. A process of manufacturing a mixed pelleted fertilizer which comprises mixing an acidic gypsum sludge which is a by-product of the manufacture of phosphoric acid and other fertilizer ingredients, pelleting said mixture, the mixture being acidic and in the late stage of the pelleting operation adding a coating of ground phosphate rock to react with the acidic surface and coat the pellets.

26. A process of manufacturing a mixed pelleted fertilizer which comprises mixing an acidic gypsum phosphate-bearing sludge and other fertilizer ingredients, pelleting said mixture, the mixture being acidic and in a late stage of the pelleting operation adding a coating of ground phosphate rock to react with the acidic surface and coat the pellets.

27. A process of manufacturing a particulate superphosphatic fertilizer which comprises mixing and agitating a phosphate-bearing gypsum sludge, an acidic sludge containing another fertilizer ingredient, and an amount of ground phosphate rock, not quite sufficient to utilize the acidic potential of said sludges, continuing said mixing and agitating, thus pelleting said mixture, said pellets having acid-wetted surfaces, and in a late stage of the pelleting operation adding a coating of ground phosphate rock to said pellets in an amount sufficient to utilize the remaining acid component upon said surfaces.

References Cited in the file of this patent

UNITED STATES PATENTS

| | | |
|---|---|---|
| 100,457 | Shepard | Mar. 1, 1870 |
| 302,266 | Liebig et al. | Aug. 22, 1884 |
| 1,146,222 | Wilson et al. | July 13, 1915 |
| 1,604,359 | Larison | Oct. 26, 1926 |
| 1,869,879 | Balz et al. | Aug. 2, 1932 |
| 1,871,195 | Ober et al. | Aug. 9, 1932 |
| 1,880,544 | Waggaman | Oct. 4, 1932 |
| 2,008,469 | Prince | July 16, 1935 |
| 2,015,384 | Nordegren | Sept. 24, 1935 |
| 2,082,809 | Pennell | June 8, 1937 |
| 2,106,223 | Nordegren | Jan. 25, 1938 |
| 2,136,793 | Gabeler et al. | Nov. 15, 1938 |

FOREIGN PATENTS

| | | |
|---|---|---|
| 5,686 | Great Britain | of 1886 |
| 280,226 | Great Britain | May 31, 1928 |
| 300,402 | Great Britain | Nov. 15, 1928 |